(12) United States Patent
Nobuhara

(10) Patent No.: US 6,241,399 B1
(45) Date of Patent: Jun. 5, 2001

(54) FERRULE ASSEMBLY AND OPTICAL MODULE

(75) Inventor: Hiroyuki Nobuhara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/349,706

(22) Filed: Jul. 8, 1999

(30) Foreign Application Priority Data

Dec. 9, 1998 (JP) .................................................. 10-350535

(51) Int. Cl.$^7$ ...................................................... G02B 6/44
(52) U.S. Cl. ............................. 385/84; 385/85; 385/86; 385/81; 385/82
(58) Field of Search ............................ 385/84, 85, 86, 385/81, 82, 83, 88, 91, 49–78

(56) References Cited

U.S. PATENT DOCUMENTS 6,086,704 * 7/2000 Kanai et al. .......................... 156/267

* cited by examiner

Primary Examiner—Mohammad Sikder
(74) Attorney, Agent, or Firm—Staas & Halsey LLP

(57) ABSTRACT

An optical module including a substrate having a groove; an optical waveguide layer formed on the substrate, the optical waveguide layer including an optical waveguide core having first and second ends, the first end being aligned with the groove, and an optical waveguide cladding covering the optical waveguide core; a ferrule having a through hole; and an optical fiber inserted and fixed in the through hole. The ferrule has a flat cut portion for semicylindrically exposing a part of the optical fiber inserted and fixed in the through hole. The ferrule is fixed at the flat cut portion to the substrate so that the part of the optical fiber exposed to the flat cut portion is inserted into the groove of the substrate until one end of the optical fiber abuts against the first end of the optical waveguide core.

4 Claims, 33 Drawing Sheets

FERRULE ASSEMBLY AND OPTICAL MODULE

BACKGROUND OF THE INVENTION

1. Field of the Invention

The present invention relates generally to an optical transmission module for use in the optical communication field, and more particularly to a receptacle type optical transmission module.

2. Description of the Related Art

In the recent information communications field, high-speed large-capacity processing and high-speed data transmission are required in response to the advancement of information. To meet this requirement, optical transmission is indispensable and preparation is now proceeding toward the expansion and diffusion of an optical communications network.

Known as a device used at many sites in an optical transmission system is an optical transmission module having an optical circuit and an electrical circuit in combination for performing opto-electrical conversion or electro-optical conversion. At present, the production scale of the optical transmission module per communications maker is about $10^5$ products per year. However, it is said that the production scale required in the future will become $10^6$ or more products per year in response to the diffusion of an optical communications network and that the production cost must be reduced to about 1/10 or less of the present level. Accordingly, it is strongly desired to establish any form of the optical transmission module which can realize mass production and low cost by minimizing the number of components to simplify the assembly process and can also ensure high reliability and long service life.

The components mounted on a printed wiring board built in a communications device are generally classified into a surface mount type and a through hole mount type. A typical example of the surface mount type components is an LSI, which has a form called a flat package. Such a component is soldered to the printed wiring board by a reflow soldering process. This process is performed by printing a solder paste on the printed wiring board, making the surface mount type component stick to the printed solder paste, and heating the whole in a conveyor oven to a solder surface temperature of 220° C. or higher.

A typical example of the through hole mount type components is a large-capacity capacitor or a multi-terminal (200 or more terminals) LSI. The multi-terminal LSI has a terminals form called a PGA (Pin Grid Array). Such a through hole mount type component is soldered to the printed wiring board by a flow soldering process. This process is performed by inserting the terminals of the through hole mount type component into through holes of the printed wiring board, and putting the printed wiring board into a solder bath heated at about 260° C. from the side opposite to its component mounting surface.

In mounting an optical module on the printed wiring board by soldering like the surface mount type component or the through hole mount type component, a so-called pigtail type of optical module with an optical fiber cord is not suitable as the optical module. That is, the optical fiber cord usually has a nylon coating, and the nylon coating has a low resistance to heat at about 80° C., so that it is melted in the soldering step. Furthermore, the optical fiber cord itself invites inconveniences in accommodation and handling at a manufacturing location, causing a remarkable reduction in mounting efficiency to the printed wiring board.

Accordingly, to allow a soldering process for the optical module and reduce a manufacturing cost, the application of a so-called receptacle type of optical module is indispensable. An example of the receptacle type optical module allowing a soldering process is known from 1996 IEICE, General Meeting Proc., C-207 (Ref. 1). In Ref. 1, there is described a receptacle type optical module manufactured by retaining a photoelectric converter and a ferrule with a bare optical fiber on a silicon substrate, next covering the whole with a silicon cap to hermetically seal an optical coupling region, and finally molding the whole with an epoxy resin.

The silicon substrate is formed with a V groove for positioning the optical fiber and the ferrule, both of which are simultaneously fixed by the silicon cap. A lead frame is fixed by an adhesive directly to the silicon substrate, so that the lead frame forms electrical input and output terminals. A commercially available MU type connector housing is mounted on an optical fiber connecting portion to realize connection and disconnection of another optical fiber. By flow soldering of the lead frame extending from the molded package, the optical module is mounted on a printed wiring board.

Another example is known from 1997 IEICE, General Meeting Proc., C-361 (Ref. 2). In Ref. 2, a V groove for positioning a bare optical fiber and a ferrule is formed on a silicon substrate as in Ref. 1. The bare optical fiber is fixed to the silicon substrate by a glass plate through a UV curable adhesive, thereby realizing optical coupling between the optical fiber and a photoelectric converter.

An optical coupling region between the photoelectric converter and the optical fiber is sealed by a transparent epoxy resin. The silicon substrate is fixed to a lead frame forming an electrical input terminal, and the lead frame is connected through a gold wire to the photoelectric converter. The whole except an end portion of the ferrule is molded with a resin to form a molded package. An optical connector adapter is mounted onto the molded package to complete an optical module. The optical connector adapter is used to detachably connect another optical fiber to the optical module. By flow soldering of the lead frame extending from the molded package, the optical module is mounted on a printed wiring board.

In an optical subscriber transmission system, economization of the optical transmission system as a whole is also necessary. To this end, there has been proposed and standardized a wavelength division multiplexing bidirectional communication system having a single office terminal to be used commonly by many subscribers. To realize this configuration, an optical module having wavelength multiplexing/demultiplexing functions is required both in each of the subscriber terminals and in the office terminal. In particular, an optical module incorporating a PLC (planar lightwave circuit) formed by integrating the wavelength multiplexing/demultiplexing functions in one chip is expected from the viewpoints of mass production and cost reduction.

In reducing an assembly cost for such a subscriber optical transmission module, it is important to ensure a cost reducing technique for a receptacle structure of an optical fiber interface, especially, an interface between a PLC having wavelength multiplexing/demultiplexing functions and an optical fiber. Conventionally known is a self-alignment technique for the connection between a PLC and an optical fiber. In this conventional technique, a fiber guide is formed on a silicon substrate so as to make alignment of the core of an optical waveguide in the PLC and the core of the optical fiber, thereby determining optimum positions of the PLC and the optical fiber in a self-aligned fashion.

According to such a self-alignment mounting method, it is not necessary to supply a current to an optical semiconductor element, and it is also not necessary to provide a complicated aligning device for aligning the core of the optical waveguide and the core of the optical fiber. Further, no time for the alignment is needed. Accordingly, this method is suitable for mass production and cost reduction.

Known as another example of the receptacle type optical module in the prior art is a technique of optically connecting an optical element and a receptacle ferrule through a V-grooved silicon substrate in a self-aligned fashion. By replacing the optical element with an optical waveguide to follow this prior art technique, it is possible to obtain a structure such that the optical waveguide and the receptacle ferrule are to be optically connected through a V-grooved PLC substrate in a self-aligned fashion.

Also known as another prior art technique is a receptacle type optical module for providing an interface between a PLC having a plurality of optical waveguide cores and multiple optical fibers. In this prior art technique, V grooves for two guide pins are formed on a substrate, and optical coupling between a plurality of optical elements mounted on the substrate or the plurality of optical waveguide cores and the multiple optical fibers is attained through the two guide pins.

The above-mentioned conventional receptacle type optical module has the following problems. First, a deep V groove must be formed on the substrate, so as to mount the ferrule on the substrate. Accordingly, the silicon substrate on which the optical element is mounted or the PLC substrate on which the optical waveguide is formed must be made thick, resulting in an increase in material cost. Further, the substrate must be left under the ferrule, causing a disadvantage in reducing the thickness of the optical module.

Secondly, in the conventional receptacle type optical module, the ferrule mounted in the V groove and the optical element or the optical waveguide core are aligned with each other. Accordingly, there is a possibility of large misalignment between the optical waveguide core (or an active layer in the optical element) and the core of the optical fiber fixed in the ferrule, causing a large optical coupling loss. As a result, characteristics of the optical module are degraded.

SUMMARY OF THE INVENTION

It is therefore an object of the present invention to provide a receptacle type optical module suitable for cost reduction and size reduction.

It is another object of the present invention to provide a ferrule assembly required for assembling of the receptacle type optical module.

In accordance with an aspect of the present invention, there is provided a ferrule assembly comprising a ferrule having a through hole; and an optical fiber inserted and fixed in the through hole; the ferrule having a flat cut portion for semicylindrically exposing a part of the optical fiber inserted and fixed in the through hole.

In accordance with another aspect of the present invention, there is provided an optical module comprising a substrate having a groove; an optical waveguide layer formed on the substrate, the optical waveguide layer comprising an optical waveguide core having first and second ends, the first end being aligned with the groove, and an optical waveguide cladding covering the optical waveguide core; a ferrule having a through hole; and an optical fiber inserted and fixed in the through hole; the ferrule having a flat cut portion for semicylindrically exposing a part of the optical fiber inserted and fixed in the through hole; the ferrule being fixed at the flat cut portion to the substrate so that the part of the optical fiber exposed to the flat cut portion is inserted into the groove of the substrate until one end of the optical fiber abuts against the first end of the optical waveguide core.

Preferably, an optical element such as a laser diode or a photodiode is mounted on the substrate at its one end portion opposite to the other end portion on which the ferrule is mounted so that the optical element is optically coupled to the second end of the optical waveguide core.

In accordance with still another aspect of the present invention, there is provided an optical module comprising a substrate having first and second grooves at opposite end portions thereof; an optical waveguide layer formed on an intermediate portion of the substrate, the optical waveguide layer comprising an optical waveguide core having first and second ends respectively aligned with the first and second grooves, and an optical waveguide cladding covering the optical waveguide core; first and second ferrules each having a through hole; and first and second optical fibers inserted and fixed in the through holes of the first and second ferrules, respectively; the first and second ferrules respectively having first and second flat cut portions for semicylindrically exposing a part of the first optical fiber inserted and fixed in the through hole of the first ferrule and a part of the second optical fiber inserted and fixed in the through hole of the second ferrule, respectively; the first ferrule being fixed at the first flat cut portion to the substrate so that the part of the first optical fiber exposed to the first flat cut portion is inserted into the first groove of the substrate until one end of the first optical fiber abuts against the first end of the optical waveguide core; the second ferrule being fixed at the second flat cut portion to the substrate so that the part of the second optical fiber exposed to the second flat cut portion is inserted into the second groove of the substrate until one end of the second optical fiber abuts against the second end of the optical waveguide core.

In accordance with a further aspect of the present invention, there is provided an optical module comprising a substrate having a groove; an optical waveguide layer formed on the substrate, the optical waveguide layer comprising a first optical waveguide core having first and second ends, a second optical waveguide core having third and fourth ends, the third end being connected to an intermediate portion of the first optical waveguide core, and an optical waveguide cladding covering the first and second optical cores; an optical wavelength filter mounted on the substrate so as to intersect t a junction between the first and second optical waveguide cores; a semicut ferrule assembly comprising a ferrule having a through hole, and an optical fiber inserted and fixed in the through hole, the ferrule having a flat cut portion for semicylindrically exposing a part of the optical fiber inserted and fixed in the through hole, the ferrule being fixed at the flat cut portion to the substrate so that the part of the optical fiber exposed to the flat cut portion is inserted into the groove of the substrate until one end of the optical fiber abuts against the first end of the first optical waveguide core; a first optical element mounted on the substrate so as to be optically coupled to the second end of the first optical waveguide core; and a second optical element mounted on the substrate so as to be optically coupled to the fourth end of the second optical waveguide core.

For example, the first optical element is a photodiode for detecting a laser beam having wavelengths in a 1.55 μm band, and the second optical element is a laser diode for emitting a laser beam having wavelengths in a 1.3 μm band.

In accordance with a further aspect of the present invention, there is provided an optical module comprising a substrate having a first maker at one end portion thereof; an optical waveguide layer formed on the substrate, the optical waveguide layer comprising an optical waveguide core and an optical waveguide cladding covering the optical waveguide core, the optical waveguide cladding having a narrow first portion and a wide second portion; a glass plate having a groove and a second marker, the glass plate being fixed to the substrate so that the second marker is aligned with the first marker, and that the groove accommodates the first portion of the optical waveguide cladding; and a semi-cut ferrule assembly comprising a ferrule having a through hole, and an optical fiber inserted and fixed in the through hole, the ferrule having a flat cut portion for semicylindrically exposing a part of the optical fiber inserted and fixed in the through hole, the ferrule being fixed at the flat cut portion to the glass plate so that the part of the optical fiber exposed to the flat cut portion is inserted in the groove of the glass plate to optically couple the optical fiber to the optical waveguide core.

In accordance with a further aspect of the present invention, there is provided an optical module comprising a substrate having a plurality of grooves; an optical waveguide layer formed on the substrate, the optical waveguide layer comprising a plurality of optical waveguide cores having a plurality of first ends respectively aligned with the grooves, and an optical waveguide cladding covering the optical waveguide cores; and a connector assembly comprising a block having a plurality of through holes, a plurality of optical fibers inserted and fixed in the through holes, respectively, and a plurality of guide pins fixed to the block, the block having a flat cut portion for semicylindrically exposing a part of each of the optical fibers inserted and fixed in the through holes; the block being fixed at the flat cut portion to the substrate so that the parts of the optical fibers exposed to the flat cut portion are inserted into the grooves of the substrate until front ends of the optical fibers abut against the first ends of the optical waveguide cores, respectively.

In accordance with a further aspect of the present invention, there is provided an optical module comprising a substrate having an end portion formed with a first groove and another end portion formed with a plurality of second grooves; an optical waveguide layer formed on an intermediate portion of the substrate, the optical waveguide layer comprising an optical waveguide core having a first end aligned with the first groove and a plurality of second ends respectively aligned with the second grooves, and an optical waveguide cladding covering the optical waveguide core; a first connector assembly comprising a first block having a first through hole, a first optical fiber inserted and fixed in the first through hole, and a plurality of first guide pins fixed to the first block, the first block having a first flat cut portion for semicylindrically exposing a part of the first optical fiber inserted and fixed in the first through hole; and a second connector assembly comprising a second block having a plurality of second through holes, a plurality of second optical fibers inserted and fixed in the second through holes, respectively, and a plurality of second guide pins fixed to the second block, the second block having a second flat cut portion for semicylindrically exposing a part of each of the second optical fibers inserted and fixed in the second through holes; the first connector assembly being fixed at the first flat cut portion to the substrate so that the part of the first optical fiber exposed to the first flat cut portion is inserted into the first groove of the substrate until a front end of the first optical fiber abuts against the first end of the optical waveguide core; the second connector assembly being fixed at the second flat cut portion to the substrate so that the parts of the second optical fibers exposed to the second flat cut portion are inserted into the second grooves of the substrate until front ends of the second optical fibers abut against the second ends of the optical waveguide cores, respectively.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
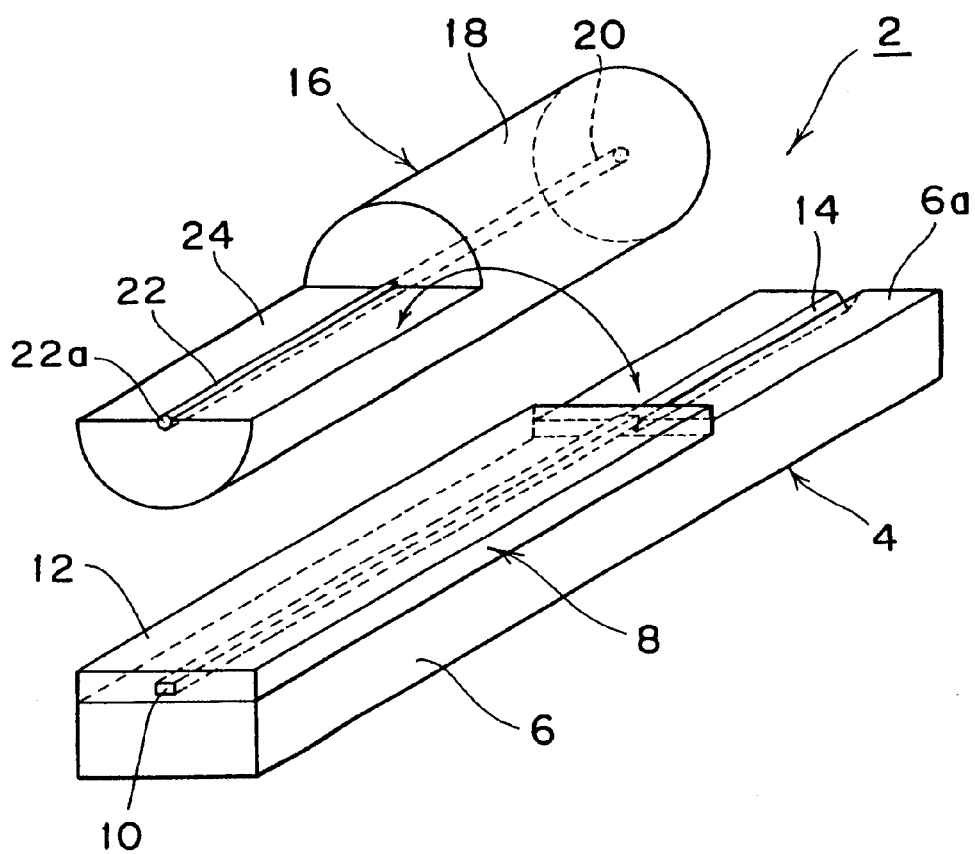
FIG. 1 is an exploded perspective view of a first preferred embodiment of the present invention.

Various preferred embodiments of the present invention will now be described in detail with reference to the drawings. In the following description of the preferred embodiments, substantially the same or similar parts will be denoted by the same reference numerals and the description thereof will be partially omitted to avoid repetition.

Figure 2:
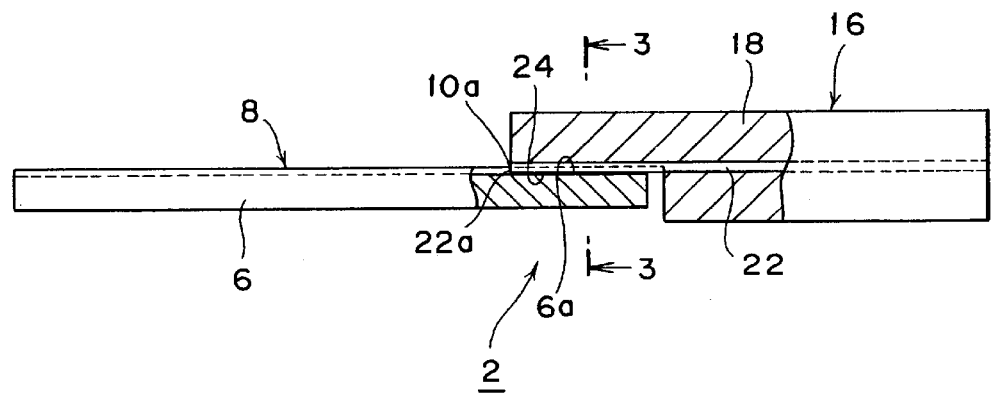
FIG. 2 is a partially sectional, side view of the first preferred embodiment in its assembled condition.
Figure 3:
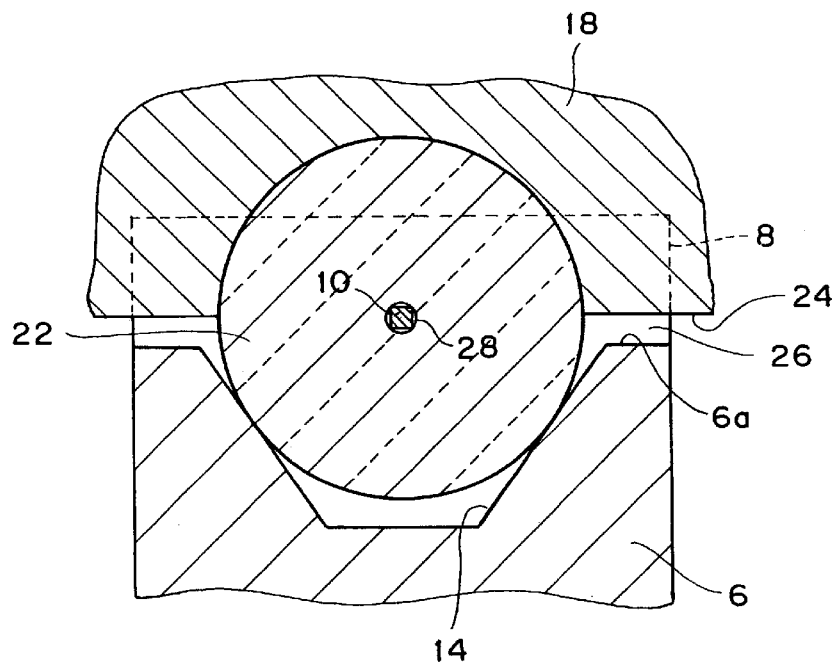
FIG. 3 is a cross section taken along the line 3—3 in FIG. 2.

Referring to FIG. 1, there is shown an exploded perspective view of an optical module 2 according to a first preferred embodiment of the present invention. FIG. 2 is a partially sectional, side view of the optical module 2, and FIG. 3 is a cross section taken along the line 3—3 in FIG. 2. The optical module 2 includes a PLC (planar lightwave circuit) 4 and a semicut ferrule assembly 16 connected to the PLC 4. The PLC 4 includes a silicon substrate 6 and an optical waveguide layer 8 formed on the silicon substrate 6. The optical waveguide layer 8 includes an optical waveguide core 10 and an optical waveguide cladding 12 covering the optical waveguide core 10. The optical waveguide core 10 has a square cross section whose side is about 8 $\mu$m. An optical signal propagates in the optical waveguide core 10 having a refractive index higher than that of the optical waveguide cladding 12.

The upper surface of the silicon substrate 6 is exposed at its one end portion 6a, and a V groove 14 is formed on the exposed upper surface 6a of the substrate 6 by anisotropic etching of silicon. The position and size of the V groove 14 are set so that when a bare optical fiber having a circular cross section whose diameter is 125 $\mu$m is mounted in the V groove 14, the core (diameter: 9.5 $\mu$m) of the bare optical fiber is aligned with the optical waveguide core 10. The semicut ferrule assembly 16 includes a cylindrical ferrule 18 having a through hole 20 and a bare optical fiber 22 inserted and fixed in the through hole 20. The ferrule 18 is formed of zirconia, for example. The ferrule 18 further includes a flat cut portion 24 for semicylindrically exposing a part of the optical fiber 22 inserted and fixed in the through hole 20.

The semicut ferrule assembly 16 is fabricated by semicylindrically cutting a part of a completely cylindrical ferrule to thereby form the ferrule 18 having the flat cut portion 24, and next inserting the bare optical fiber 22 into the through hole 20 so that the opposite end faces of the bare optical fiber 22 become substantially flush with the opposite end faces of the ferrule 18. The bare optical fiber 22 is fixed by an adhesive in the through hole 20 defined in a cylindrical portion of the ferrule 18 except the flat cut portion 24. The semicut ferrule assembly 16 is mounted to the PLC 4 by inserting the bare optical fiber 22 exposed to the flat cut portion 24 into the V groove 14 exposed to the upper surface 6a of the silicon substrate 6 until one end 22a of the bare optical fiber 22 abuts against one end 10a of the optical waveguide core 10, and fixing the flat cut portion 24 of the ferrule 18 to the upper surface 6a of the silicon substrate 6 by using an adhesive.

As shown in FIG. 3, a gap 26 is defined between the upper surface 6a of the silicon substrate 6 and the flat cut portion 24 of the ferrule 18. The adhesive is applied to this gap 26 to thereby fix the ferrule 18 to the silicon substrate 6. Reference numeral 28 in FIG. 3 denotes the core of the bare optical fiber 22. It is shown that the core 28 of the bare optical fiber 22 is aligned with the optical waveguide core 10.

The optical module 2 according to the first preferred embodiment has the following advantages.

(1) A pressure plate for fixing the ferrule 18 or the bare optical fiber 22 is not required, but a minimum number of components (only the PLC 4 and the ferrule assembly 16) and a minimum assembly cost are required.

(2) It is not necessary to provide adhesive bonding areas on the opposite sides of the diametrical portion of the ferrule 18 on the PLC substrate (the silicon substrate) 6, so that the width of the PLC substrate 6 can be reduced.

(3) It is not necessary to form a groove for mounting the ferrule 18 on the PLC substrate 6, but the V groove 14 for mounting the bare optical fiber 22 is only formed on the PLC substrate 6, so that the thickness of the PLC substrate 6 can be reduced.

(4) The bare optical fiber 22 does not project from the ferrule 18, so that there is no possibility of breaking of the optical fiber 22 in assembling the optical module 2, thereby improving the worker safety and yield rate.

(5) The bare optical fiber 22 is fixed by adhesion in the ferrule 18 so as to prevent generation of fiber bends, so that the stability against temperature variations or the like can be ensured to thereby attain high reliability with less characteristics variations.

Figure 4:
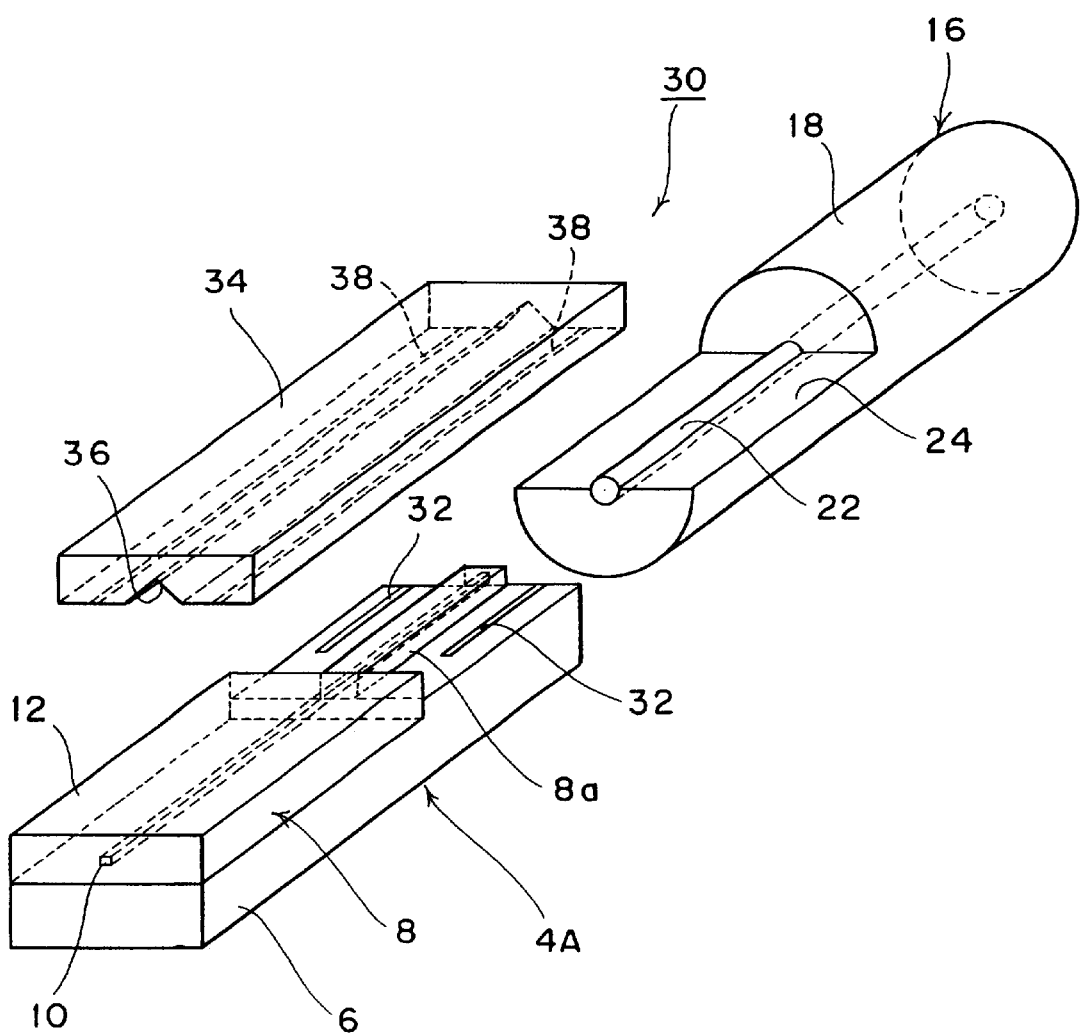
FIG. 4 is an exploded perspective view of a second preferred embodiment of the present invention.
Figure 5:
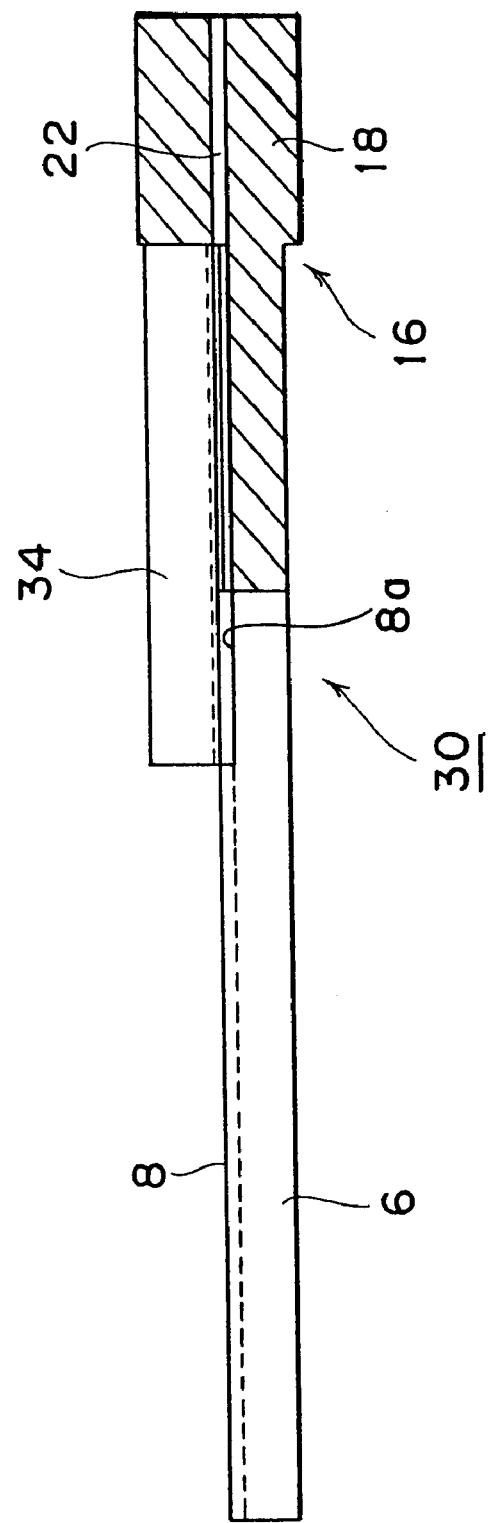
FIG. 5 is a partially sectional, side view of the second preferred embodiment in its assembled condition.
Figure 6:
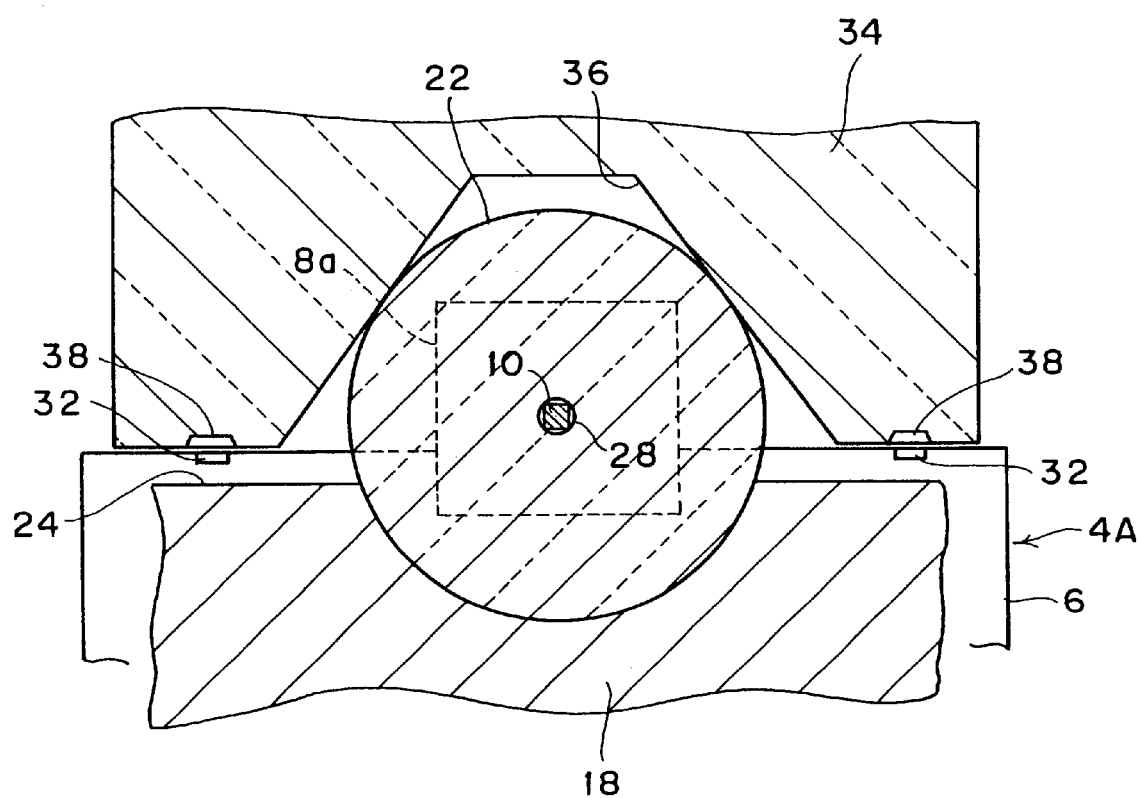
FIG. 6 is a cross section of the second preferred embodiment as similar to FIG. 3.

Referring to FIG. 4, there is shown an exploded perspective view of an optical module 30 according to a second preferred embodiment of the present invention. FIG. 5 is a partially sectional, side view of the optical module 30, and FIG. 6 is a cross section of the optical module 30 as similar to FIG. 3. The optical module 30 includes a PLC 4A, a semicut ferrule assembly 16, and a glass plate 34 having a V groove 36. The PLC 4A includes a silicon substrate 6 and an optical waveguide layer 8. The optical waveguide layer 8 of the PLC 4A includes an optical waveguide core 10 and an optical waveguide cladding 12. The optical waveguide cladding 12 is partially removed to form a narrow portion 8a in which the optical waveguide core 10 extends. The optical waveguide core 10 extends over the length of the silicon substrate 6.

The upper surface of the silicon substrate 6 is exposed on the opposite sides of the narrow portion 8a of the optical waveguide layer 8, and a pair of marker grooves 32 for positioning to the glass plate 34 are formed by etching on this exposed upper surface of the silicon substrate 6. The semicut ferrule assembly 16 is similar in structure to that of the optical module 2 according to the first preferred embodiment. The V groove 36 is formed on the lower surface of the glass plate 34 so as to extend over the length thereof. A pair of marker grooves 38 for positioning to the PLC 4A are also formed on the lower surface of the glass plate 34 so as to extend over the length thereof. The V groove 36 and the marker grooves 38 are formed by cutting or glass molding, for example.

As best shown in FIG. 6, the glass plate 34 and the PLC 4A are fixed together by an adhesive in such a manner that the narrow portion 8a of the optical waveguide layer 8 is accommodated in the V groove 36 of the glass plate 34, and that the marker grooves 32 of the PLC 4A are vertically aligned with the marker grooves 38 of the glass plate 34. On the other hand, the glass plate 34 and the semicut ferrule assembly 16 are fixed together by an adhesive in such a manner that the bare optical fiber 22 exposed to the flat cut portion 24 of the ferrule 18 is fitted into the V groove 36 of the glass plate 34 to effect self-aligned positioning.

A gap of about 10 μm is defined between the flat cut portion 24 of the ferrule assembly 16 and the lower surface of the glass plate 34, and the adhesive is charged into the gap to thereby fix the glass plate 34 and the ferrule assembly 16. The shape and size of the V groove 36 and the position of the V groove 36 relative to the marker grooves 32 and 38 are set so that the optical waveguide core 10 is aligned with the core 28 of the bare optical fiber 22, shown in FIG. 6.

The optical module 30 according to the second preferred embodiment has the following advantages.

(1) It is not necessary to form a V groove on the PLC substrate 6, but the semicut ferrule assembly 16 is connected through the V-grooved glass plate 34 to the PLC 4A, thereby realizing low-loss optical connection at a low cost.

(2) It is not necessary to provide adhesive bonding areas on the opposite sides of the diametrical portion of the ferrule 18 on the PLC substrate (the silicon substrate) 6, so that the width of the PLC substrate 6 can be reduced.

(3) The bare optical fiber 22 does not project from the ferrule 18, so that there is no possibility of breaking of the optical fiber 22 in assembling the optical module 30, thereby improving the worker safety and yield rate.

(4) The bare optical fiber 22 is fixed by adhesion in the ferrule 18 so as to prevent generation of fiber bends, so that the stability against temperature variations or the like can be ensured to thereby attain high reliability with less characteristics variations.

Figure 7:
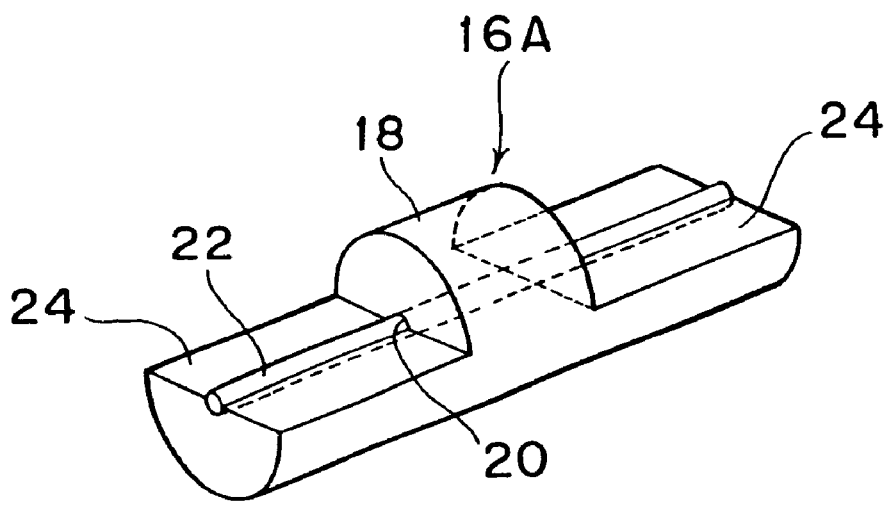
FIG. 7 is a perspective view showing another preferred embodiment of a ferrule assembly.

Referring to FIG. 7, there is shown a perspective view of a semicut ferrule assembly 16A according to another preferred embodiment of the present invention. The ferrule assembly 16A includes a cylindrical ferrule 18 having a through hole 20 and a bare optical fiber 22 inserted and fixed in the through hole 20. The ferrule 18 has a cylindrical intermediate portion and a pair of flat cut portions 24 formed at the opposite end portions for semicylindrically exposing the opposite end portions of the optical fiber 22.

Figure 8A:
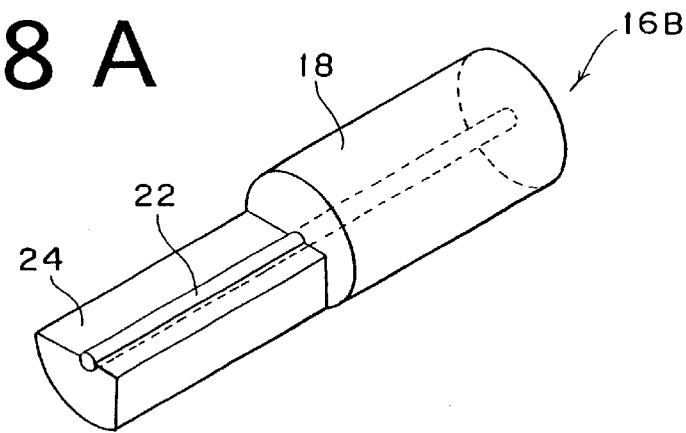
FIGS. 8A to 8C are perspective views showing other preferred embodiments of the ferrule assembly.
Figure 8B:
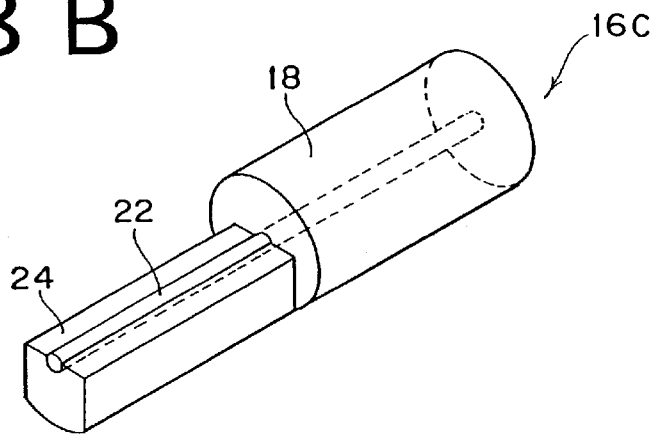
Figure 8C:
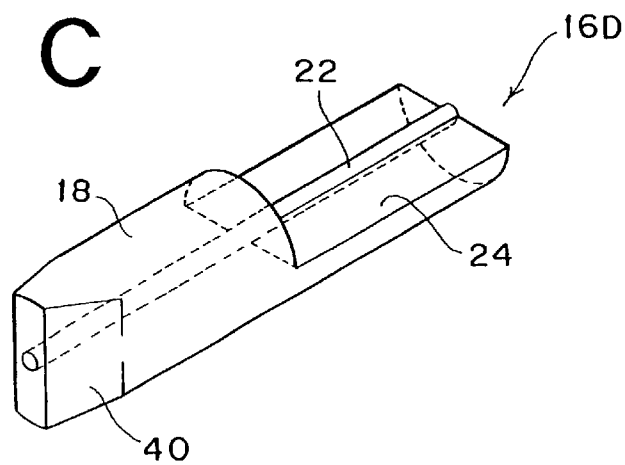

FIGS. 8A, 8B, and 8C show semicut ferrule assemblies 16B, 16C, and 16D, respectively, according to other preferred embodiments of the present invention. The ferrule assembly 16B shown in FIG. 8A is different from the ferrule assembly 16 shown in FIG. 1 in only the point that the width of the flat cut portion 24 is reduced. The ferrule assembly 16C shown in FIG. 8B is different from the ferrule assembly 16B shown in FIG. 8A in only the point that the width of the flat cut portion 24 is reduced. The ferrule assembly 16D shown in FIG. 8C is different from the ferrule assembly 16 shown in FIG. 1 in only the point that the cylindrical portion of the ferrule 18 is formed at one end thereof with a taper 40. The ferrule assembly 16D is effective in configuring a compact wavelength filter module to be hereinafter described.

Figure 9A:
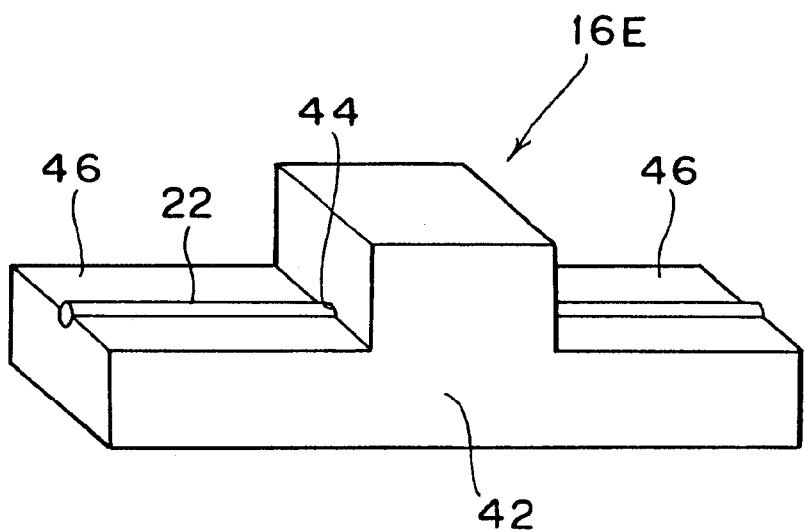
FIGS. 9A and 9B are perspective views showing still other preferred embodiments of the ferrule assembly.
Figure 9B:
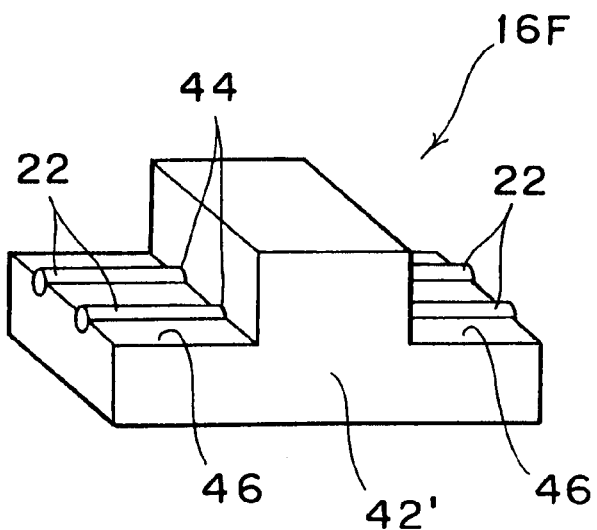

FIGS. 9A and 9B show semicut ferrule assemblies 16E and 16F, respectively, according to still other preferred embodiments of the present invention. The ferrule assembly 16E shown in FIG. 9A is similar to the ferrule assembly 16A shown in FIG. 7 except that a rectangular prismatic ferrule 42 is adopted. That is, the ferrule assembly 16E includes the ferrule 42 having a through hole 44 and a bare optical fiber 22 inserted in the through hole 44. The ferrule 42 has a rectangular prismatic intermediate portion and a pair of flat cut portions 46 formed at the opposite end portions for semicylindrically exposing the opposite end portions of the optical fiber 22.

The ferrule assembly 16F shown in FIG. 9B is similar to the ferrule assembly 16E shown in FIG. 9A except that a plurality of bare optical fibers 22 are inserted and fixed in a plurality of through holes 44 extending through a rectangular prismatic ferrule 42'. Thus, the outside shape of the ferrule used in the present invention is not necessarily cylindrical for the connection of a PLC and an optical element or the connection of a PLC and another PLC. The preferred embodiments shown in FIGS. 9A and 9B intended for size reduction are effective in providing high-density optical connection.

Figure 10:
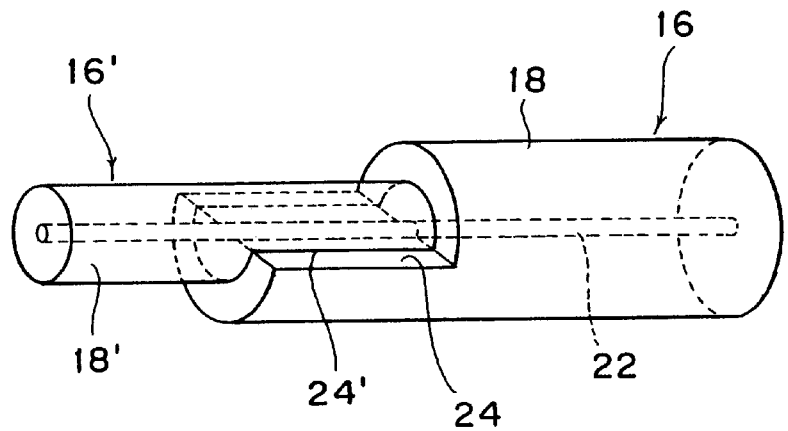
FIG. 10 is a perspective view showing a coupling structure of different types of ferrules.

Referring to FIG. 10, there is shown a coupling structure of different types of ferrules. By combining two semicut ferrules 18 and 18' different in diameter, a ferrule structure for converting an external size can be simply obtained. This structure is excellent in reliability because no bending of the bare optical fiber 22 occurs.

Figure 11:
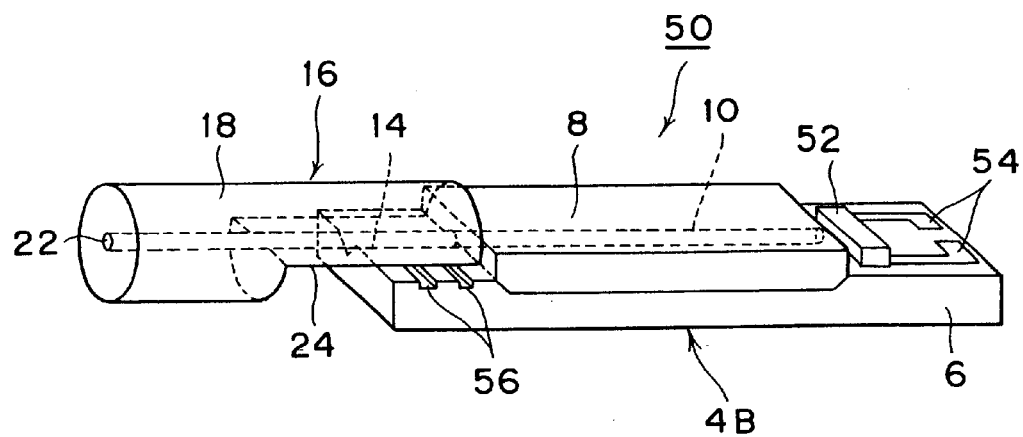
FIG. 11 is a perspective view of a third preferred embodiment of the present invention.

Referring to FIG. 11, there is shown a perspective view of an optical module 50 according to a third preferred embodiment of the present invention. The optical module 50 includes a V-grooved PLC 4B, a semicut ferrule assembly 16, and an optical element 52. The PLC 4B includes a silicon substrate 6 and an optical waveguide layer 8 formed on an intermediate portion of the silicon substrate 6. The ferrule assembly 16 is mounted on one end portion of the silicon substrate 6, and the optical element 52 is mounted on the other end portion of the silicon substrate 6.

The optical element 52 is a laser diode or a photodiode, for example, and it is mounted on the substrate 6 so as to be optically coupled to the optical waveguide core 10 of the optical waveguide layer 8. Electrodes 54 for the optical element 52 are also formed on the other end portion of the substrate 6. The one end portion of the substrate 6 of the PLC 4B is formed with a V groove 14 aligned with the optical waveguide core 10 in the layer 8. The flat cut portion 24 of the ferrule assembly 16 is bonded to the one end portion of the substrate 6 so that the bare optical fiber 22 is engaged with the V groove 14 of the substrate 6. Accordingly, the core of the optical fiber 22 is substantially aligned with the optical waveguide core 10, thereby realizing low-loss optical coupling.

The one end portion of the silicon substrate 6 to which the flat cut portion 24 of the ferrule assembly 16 is bonded is further formed with a plurality of grooves 56 for receiving an adhesive. The grooves 56 extend over the width of the substrate 6 in perpendicular relationship to the V groove 14. An optical functional circuit such as a wavelength filter, optical branching circuit, optical modulator, and optical switch is incorporated in the optical waveguide layer 8. A plurality of optical elements or an optical element array rather than the single optical element 52 may be mounted on the substrate 6. Further, a plurality of semicut ferrule assemblies rather than the single semicut ferrule assembly 16 may be mounted on the substrate 6.

Figure 12:
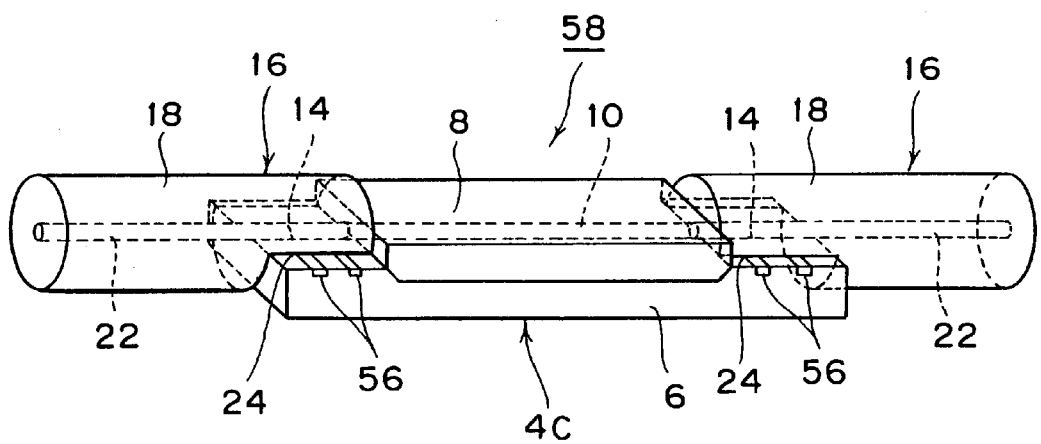
FIG. 12 is a perspective view of a fourth preferred embodiment of the present invention.

Referring to FIG. 12, there is shown a perspective view of an optical module 58 according to a fourth preferred embodiment of the present invention. The optical module 58 includes a V-grooved PLC 4C and a pair of semicut ferrule assemblies 16. The PLC 4C includes a silicon substrate 6 and an optical waveguide layer 8 formed on an intermediate portion of the silicon substrate 6. The pair of ferrule assemblies 16 are mounted on the opposite end portions of the silicon substrate 6. The opposite end portions of the substrate 6 of the PLC 4C are formed with a pair of V grooves 14 each aligned with the optical waveguide core 10 in the layer 8. The flat cut portions 24 of the ferrule assemblies 16 are bonded to the opposite end portions of the substrate 6 so that the bare optical fibers 22 of the ferrule assemblies 16 are engaged with the V grooves 14 formed on the opposite end portions of the substrate 6. Accordingly, the core of the optical fiber 22 of each ferrule assembly 16 is substantially aligned with the optical waveguide core 10, thereby realizing low-loss optical coupling.

Each end portion of the silicon substrate 6 to which the flat cut portion 24 of each ferrule assembly 16 is bonded is further formed with a plurality of grooves 56 for receiving an adhesive. The grooves 56 formed on each end portion of the substrate 6 extend over the width of the substrate 6 in perpendicular relationship to the V groove 14 formed on the same end portion of the substrate 6. An optical functional circuit such as a wavelength filter, optical branching circuit, optical modulator, and optical switch is incorporated in the optical waveguide layer 8.

Figure 13:
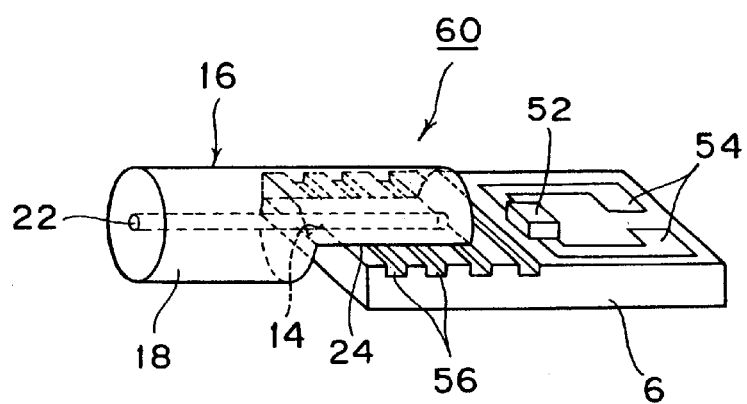
FIG. 13 is a perspective view of a fifth preferred embodiment of the present invention.

Referring to FIG. 13, there is shown a perspective view of an optical module 60 according to a fifth preferred embodiment of the present invention. The optical module 60 includes a V-grooved silicon substrate 6, a semicut ferrule assembly 16, and an optical element 52. The ferrule assembly 16 is mounted on one end portion of the silicon substrate 6, and the optical element 52 is mounted on the other end portion of the silicon substrate 6 so as to be optically coupled to the bare optical fiber 22 of the ferrule assembly 16. Electrodes 54 for the optical element 52 are formed on the other end portion of the substrate 6.

The one end portion of the substrate 6 is formed with a V groove 14 aligned with an active layer of the optical element 52. The flat cut portion 24 of the ferrule assembly 16 is bonded to the one end portion of the substrate 6 so that the bare optical fiber 22 is engaged with the V groove 14 of the substrate 6. Accordingly, the core of the optical fiber 22 is substantially aligned with the active layer of the optical element 52, thereby realizing low-loss optical coupling. The one end portion of the silicon substrate 6 to which the flat cut portion 24 of the ferrule assembly 16 is bonded is further formed with a plurality of grooves 56 for receiving an adhesive. The grooves 56 extend over the width of the substrate 6 in perpendicular relationship to the V groove 14. A plurality of optical elements or an optical element array rather than the single optical element 52 may be mounted on the substrate 6.

Figure 14:
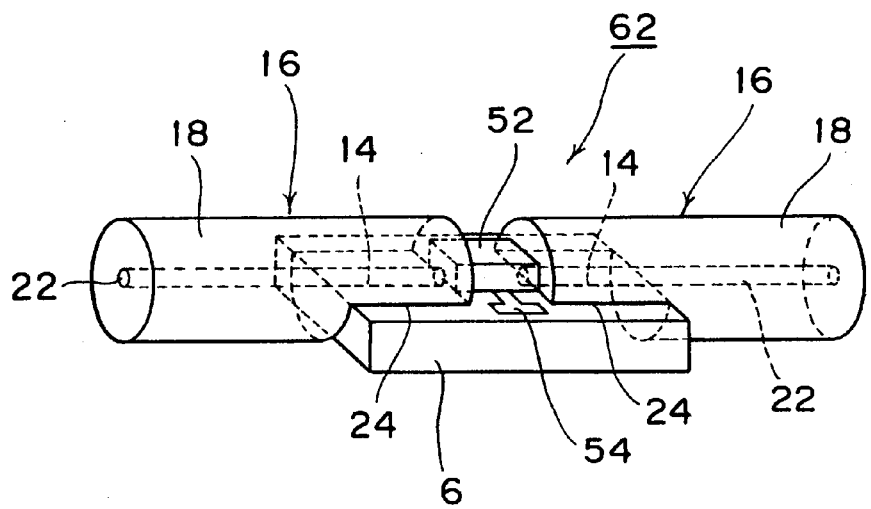
FIG. 14 is a perspective view of a sixth preferred embodiment of the present invention.

Referring to FIG. 14, there is shown a perspective view of an optical module 62 according to a sixth preferred embodiment of the present invention. The optical module 62 includes a V-grooved silicon substrate 6, a pair of semicut ferrule assemblies 16, and an optical element 52. The pair of ferrule assemblies 16 are mounted on the opposite end portions of the silicon substrate 6. The optical element 52 is mounted on an intermediate portion of the silicon substrate 6 so as to be sandwiched between the pair of ferrule assemblies 16. Electrodes 54 for the optical element 52 are formed on the intermediate portion of the silicon substrate 6.

The opposite end portions of the substrate 6 are formed with a pair of V grooves 14 each aligned with an active layer of the optical element 52. The flat cut portions 24 of the ferrule assemblies 16 are bonded to the opposite end portions of the substrate 6 so that the bare optical fibers 22 of the ferrule assemblies 16 are engaged with the V grooves 14 formed on the opposite end portions of the substrate 6. Accordingly, the core of the optical fiber 22 of each ferrule assembly 16 is substantially aligned with the active layer of the optical element 52, thereby realizing low-loss optical coupling. Each end portion of the silicon substrate 6 to which the flat cut portion 24 of each ferrule assembly 16 is bonded is further formed with a plurality of grooves (not shown) for receiving an adhesive.

Figure 15:
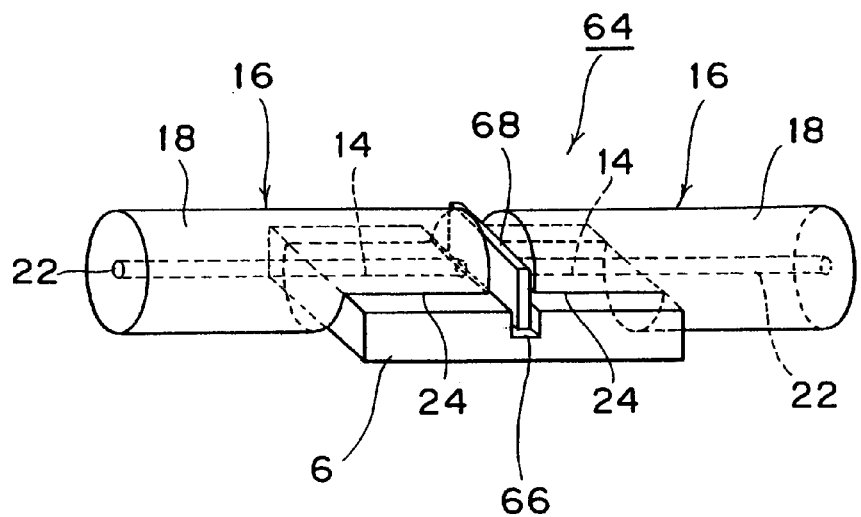
FIG. 15 is a perspective view of a seventh preferred embodiment of the present invention.

Referring to FIG. 15, there is shown a perspective view of an optical module 64 according to a seventh preferred embodiment of the present invention. The optical module 64 includes a V-grooved silicon substrate 6, a pair of semicut ferrule assemblies 16, and a thin-film or thin-sheet passive optical component 68. The pair of ferrule assemblies 16 are mounted on the opposite end portions of the silicon substrate 6. The passive optical component 68 is vertically inserted and fixed in a rectangular groove 66 formed at an intermediate portion of the silicon substrate 6 so as to be sandwiched between the pair of ferrule assemblies 16. The rectangular groove 66 extends over the width of the silicon substrate 6. The opposite end portions of the substrate 6 are formed with a pair of V grooves 14 aligned with each other. The flat cut portions 24 of the ferrule assemblies 16 are bonded to the opposite end portions of the substrate 6 so that the bare optical fibers 22 of the ferrule assemblies 16 are engaged with the V grooves 14 formed on the opposite end portions of the substrate 6. Accordingly, the cores of the optical fibers 22 positioned in the V grooves 14 are substantially aligned with each other, thereby realizing low-loss optical coupling.

The passive optical component 68 in the form of thin film or thin sheet fixed in the rectangular groove 66 projects from the upper surface of the silicon substrate 6, and the opposite side surfaces of the passive optical component 68 at its projecting portion are sandwiched between the opposite end faces of the ferrule assemblies 16 and bonded thereto. Accordingly, a large bonding area of the passive optical component 68 is ensured, and it is supported from the opposite sides by the ferrule assemblies 16, thereby obtaining a high fixing strength to stabilize the passive optical component 68. Each end portion of the silicon substrate 6 to which the flat cut portion 24 of each ferrule assembly 16 is bonded is further formed with a plurality of grooves (not shown) for receiving an adhesive.

Figure 16:
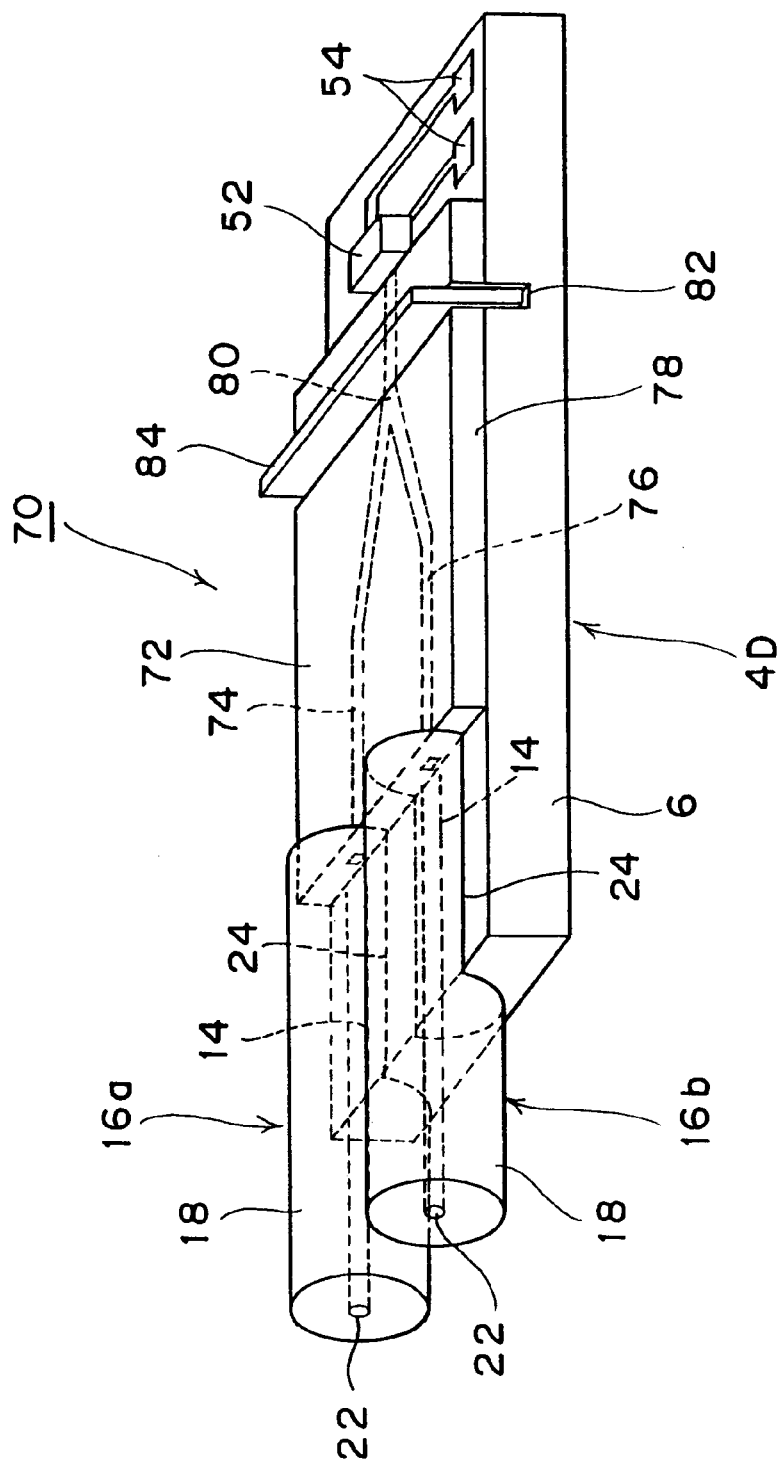
FIG. 16 is a perspective view of an eighth preferred embodiment of the present invention.

Referring to FIG. 16, there is shown a perspective view of an optical module 70 according to an eighth preferred embodiment of the present invention. The optical module 70 includes a V-grooved PLC 4D, a pair of semicut ferrule assemblies 16a and 16b, an optical element 52, and a thin-film optical wavelength filter 84. The PLC 4D includes a V-grooved silicon substrate 6 and an optical waveguide layer 72 formed on an intermediate portion of the silicon substrate 6. The optical waveguide layer 72 is a Y-branch type optical waveguide including a first optical waveguide core 74, a second optical waveguide core 76 connected to an intermediate portion of the first optical waveguide core 74, and an optical waveguide cladding 78 covering the first and second optical waveguide cores 74 and 76. The pair of ferrule assemblies 16a and 16b are mounted on one end portion of the silicon substrate 6, and the optical element 52 is mounted on the other end portion of the silicon substrate 6. Electrodes 54 for the optical element 52 are formed on the other end portion of the silicon substrate 6.

The thin-film optical wavelength filter 84 is vertically inserted and fixed in a rectangular groove 82 cut through the optical waveguide layer 72 into the substrate 6 so as to intersect a Y branch 80 of the Y-branch type optical waveguide, i.e., a junction between the first optical waveguide core 74 and the second optical core 76. The rectangular groove 82 extends over the width of the substrate 6. The one end portion of the silicon substrate 6 is formed with a pair of V grooves 14 aligned with the first and second optical waveguide cores 74 and 76. The flat cut portions 24 of the ferrule assemblies 16a and 16b are bonded to the one end portion of the substrate 6 so that the bare optical fibers 22 of the ferrule assemblies 16a and 16b are engaged with the V grooves 14 formed on the one end portion of the substrate 6. Accordingly, the core of the optical fiber 22 of the ferrule assembly 16a is substantially aligned with the first optical waveguide core 74, and the core of the optical fiber 22 of the ferrule assembly 16b is substantially aligned with the second optical waveguide core 76, thereby realizing low-loss optical coupling.

The one end portion of the silicon substrate 6 to which the flat cut portions 24 of the ferrule assemblies 16a and 16b are bonded is further formed with a plurality of grooves (not shown) for receiving an adhesive. For example, a certain component of light entered the first optical waveguide core 74 from the ferrule assembly 16a is transmitted by the wavelength filter 84 to enter the optical element 52, and the remaining component of the light is reflected by the wavelength filter 84 to enter the second optical waveguide core 76 and to emerge from the ferrule assembly 16b.

Figure 17:
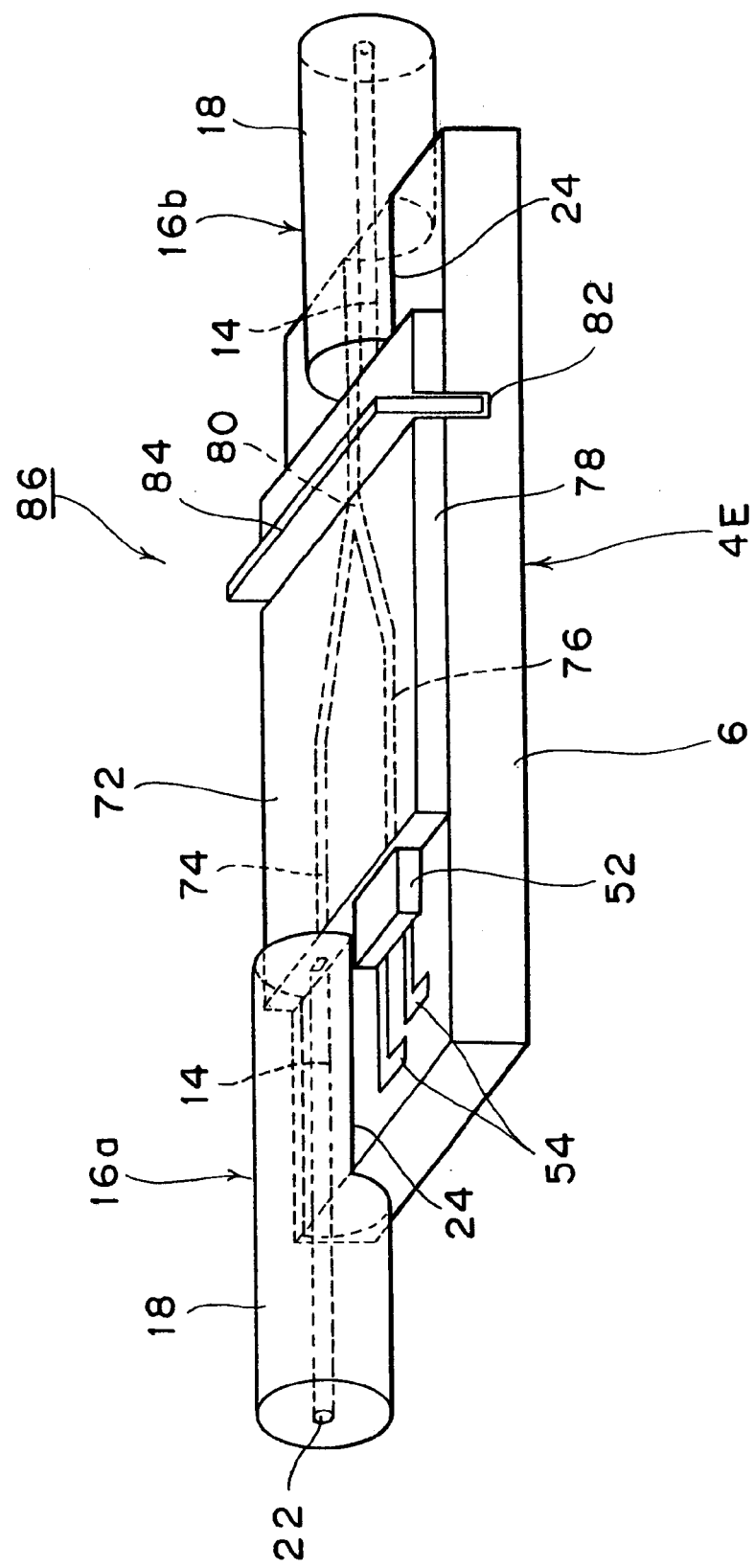
FIG. 17 is a perspective view of a ninth preferred embodiment of the present invention.

Referring to FIG. 17, there is shown a perspective view of an optical module 86 according to a ninth preferred embodiment of the present invention. Like the eighth preferred embodiment mentioned above, the optical module 86 includes a V-grooved PLC 4E, a pair of semicut ferrule assemblies 16a and 16b, an optical element 52, and a thin-film optical wavelength filter 84. The PLC 4E includes a V-grooved silicon substrate 6 and an optical waveguide layer 72 formed on an intermediate portion of the silicon substrate 6. The optical waveguide layer 72 has the same structure as that in the eighth preferred embodiment shown in FIG. 16. The pair of ferrule assemblies 16a and 16b are mounted on the opposite end portions of the silicon substrate 6, and the optical element 52 is mounted on one end portion of the silicon substrate 6 where the ferrule assembly 16a is mounted. Electrodes 54 for the optical element 52 are formed on the one end portion of the silicon substrate 6. The thin-film optical wavelength filter 84 is vertically inserted and fixed in a rectangular groove 82 as similar to the structure in the eighth preferred embodiment shown in FIG. 16.

The opposite end portions of the silicon substrate 6 are formed with a pair of V grooves 14 aligned with the opposite ends of the first optical waveguide core 74. The flat cut portions 24 of the ferrule assemblies 16a and 16b are bonded to the opposite end portions of the substrate 6 so that the bare optical fibers 22 of the ferrule assemblies 16a and 16b are engaged with the V grooves 14 formed on the opposite end portions of the substrate 6. Accordingly, the core of the optical fiber 22 of the ferrule assembly 16a is substantially aligned with the first end of the first optical waveguide core 74, and the core of the optical fiber 22 of the ferrule assembly 16b is substantially aligned with the second end of the first optical waveguide core 74, thereby realizing low-loss optical coupling. Each of the opposite end portions of the silicon substrate 6 to which the flat cut portions 24 of the ferrule assemblies 16a and 16b are bonded is further formed with a plurality of grooves (not shown) for receiving an adhesive.

For example, a certain component of light entered the first optical waveguide core 74 from the ferrule assembly 16a is reflected by the wavelength filter 84 to enter the optical element 52 through the second waveguide core 76, and the remaining component of the light is transmitted by the wavelength filter 84 to enter the ferrule assembly 16b and to emerge therefrom. In the case that the optical element 52 is a light emitting element such as a laser diode, a certain component of light emitted from the optical element 52 is reflected by the wavelength filter 84 to enter the ferrule assembly 16a and to emerge therefrom, and the remaining component of the light is transmitted by the wavelength filter 84 to enter the ferrule assembly 16b and to emerge therefrom.

Figure 18:
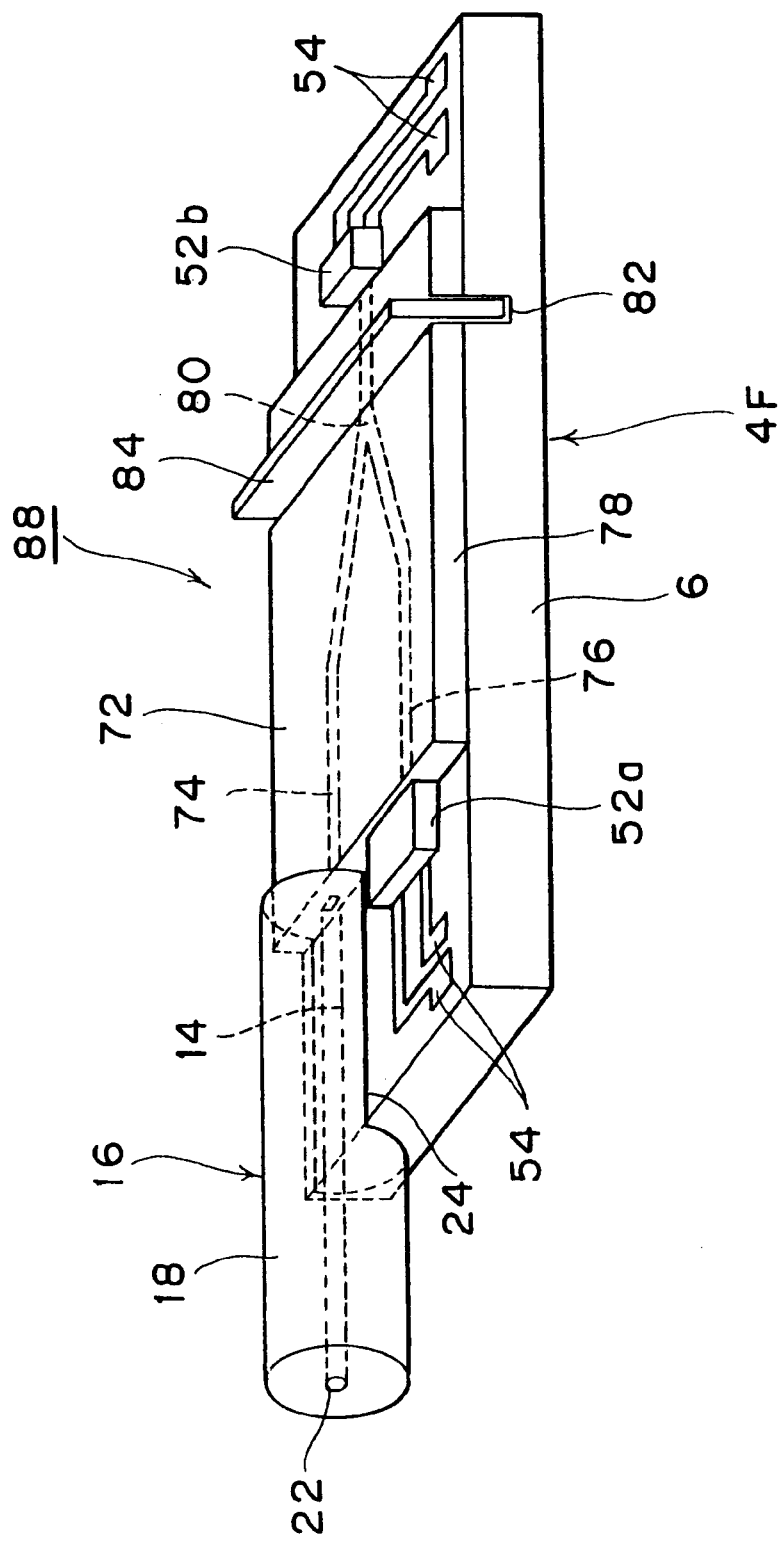
FIG. 18 is a perspective view of a tenth preferred embodiment of the present invention.

Referring to FIG. 18, there is shown a perspective view of an optical module 88 according to a tenth preferred embodiment of the present invention. Like the eighth and ninth preferred embodiments mentioned above, the optical module 88 includes a V-grooved PLC 4F, a semicut ferrule assembly 16, a pair of optical elements 52a and 52b, and a thin-film optical wavelength filter 84. The PLC 4F includes a V-grooved silicon substrate 6 and an optical waveguide layer 72 formed on an intermediate portion of the silicon substrate 6. The optical waveguide layer 72 has the same structure as that in the eighth preferred embodiment shown in FIG. 16. The ferrule assembly 16 and the optical element 52a are mounted on one end portion of the silicon substrate 6, and the optical element 52b is mounted on the other end portion of the silicon substrate 6. Electrodes 54 for the optical element 52a are formed on the one end portion of the silicon substrate 6, and electrodes 54 for the optical element 52b are formed on the other end portion of the silicon substrate 6. The thin-film optical wavelength filter 84 is vertically inserted and fixed in a rectangular groove 82 as similar to the structure in the eighth preferred embodiment shown in FIG. 16. For example, the wavelength filter 84 transmits light having wavelengths in a 1.55 µm band, and reflects light having wavelengths in a 1.3 µm band.

The one end portion of the silicon substrate 6 is formed with a v groove 14 aligned with the first end of the first optical waveguide core 74. The flat cut portion 24 of the ferrule assembly 16 is bonded to the one end portion of the substrate 6 so that the bare optical fiber 22 of the ferrule assembly 16 is engaged with the V groove 14 formed on the one end portion of the substrate 6. Accordingly, the core of the optical fiber 22 of the ferrule assembly 16 is substantially aligned with the first end of the first optical waveguide core 74, thereby realizing low-loss optical coupling. The one end portion of the silicon substrate 6 to which the flat cut portion 24 of the ferrule assembly 16 is bonded is further formed with a plurality of grooves (not shown) for receiving an adhesive.

For example, a certain component of light entered the first optical waveguide core 74 from the ferrule assembly 16 is reflected by the wavelength filter 84 to enter the optical element 52a, and the remaining component of the light is transmitted by the wavelength filter 84 to enter the optical element 52b. In the case that the optical element 52a is a light emitting element such as a laser diode, a certain component of light emitted from the optical element 52a is reflected by the wavelength filter 84 to enter the ferrule assembly 16 and to emerge therefrom, and the remaining component of the light is transmitted by the wavelength filter 84 to enter the optical element 52b.

Figure 19:
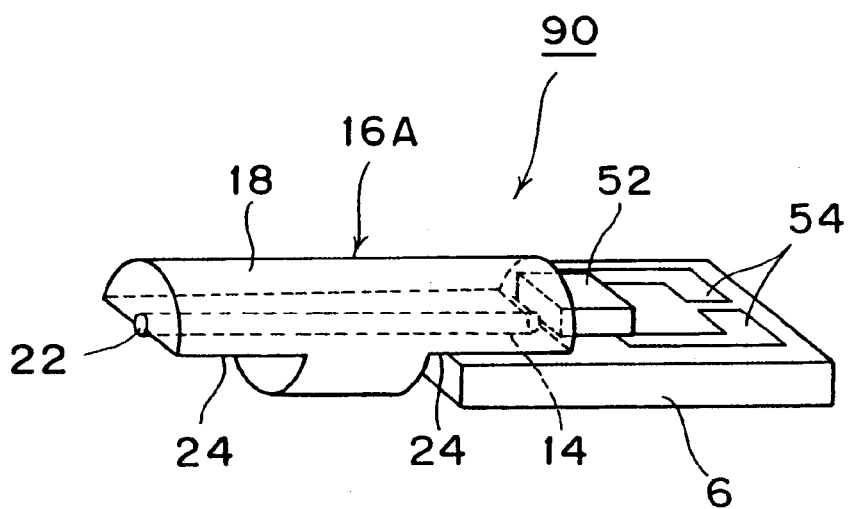
FIG. 19 is a perspective view of an eleventh preferred embodiment of the present invention.

Referring to FIG. 19, there is shown a perspective view of an optical module 90 according to an eleventh preferred embodiment of the present invention. The optical module 90 includes a V-grooved silicon substrate 6, a semicut ferrule assembly 16A similar to that shown in FIG. 7, and an optical element 52. The silicon substrate 6 is formed at its one end portion with a V groove 14. The ferrule assembly 16A is mounted on the silicon substrate 6 in such a manner that one of the two cut flat portions 24 of the ferrule assembly 16A is bonded to the one end portion of the substrate 6 in the condition where the bare optical fiber 22 is engaged with the V groove 14. By connecting the optical module 90 at the other flat cut portion 24 to a PLC (not shown), an optical functional system can be simply configured.

Figure 20:
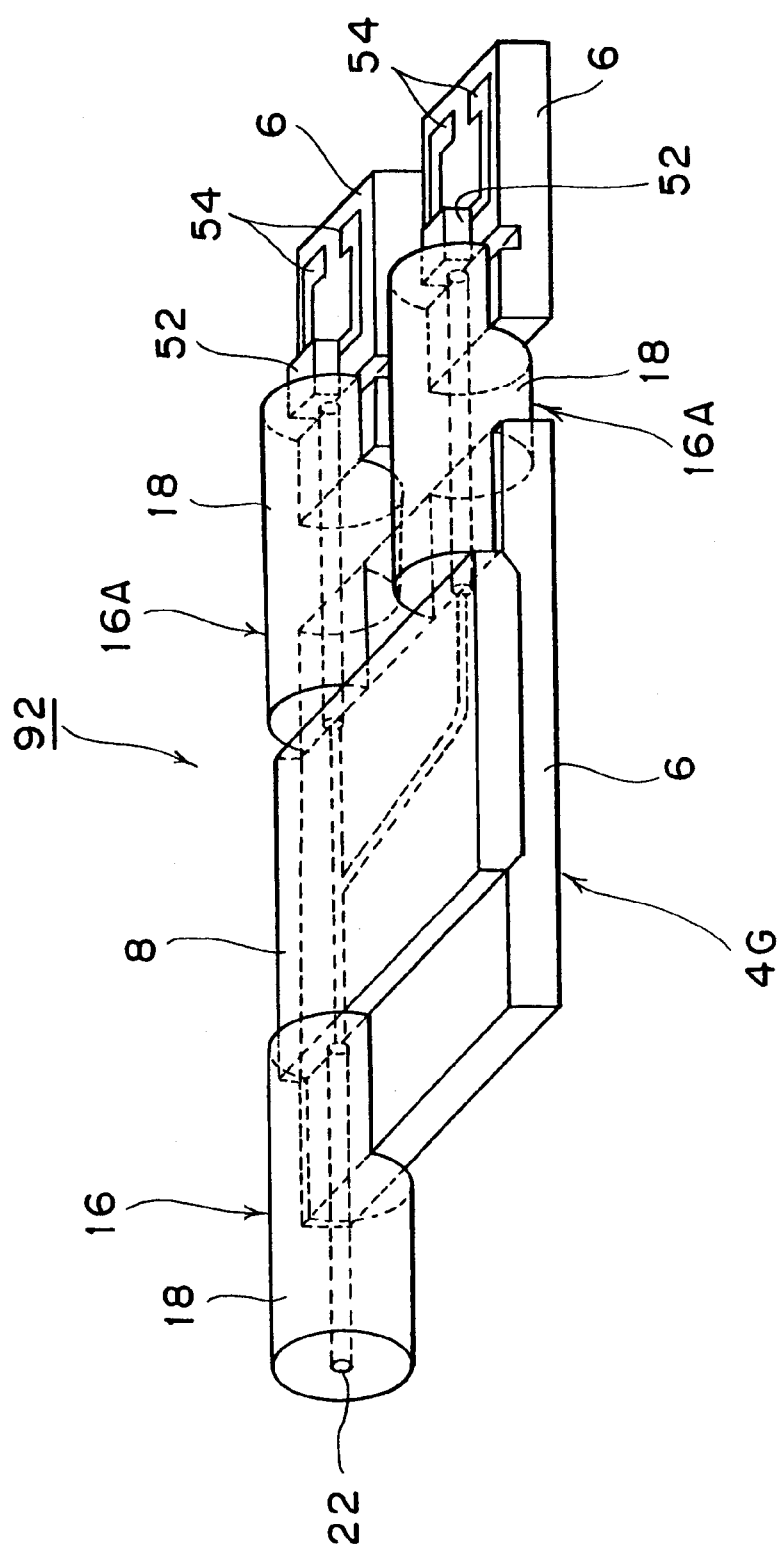
FIG. 20 is a perspective view of a twelfth preferred embodiment of the present invention.

Referring to FIG. 20, there is shown a perspective view of an optical module 92 according to a twelfth preferred embodiment of the present invention. The optical module 92 is configured by connecting two optical modules each similar to the optical module 90 shown in FIG. 19 to a PLC 4G at one end portion thereof. A semicut ferrule assembly 16 is mounted on the other end portion of the PLC 4G. In modification, a wavelength filter or an optical switch circuit may be mounted in the optical waveguide layer 8 of the PLC 4G.

Figure 21:
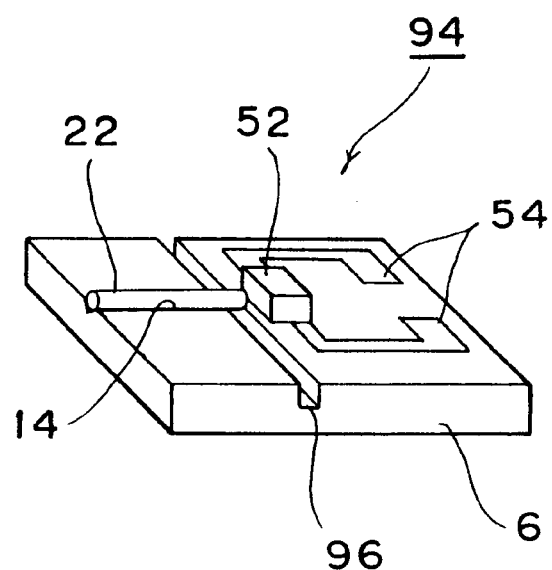
FIG. 21 is a perspective view of a thirteenth preferred embodiment of the present invention.

Referring to FIG. 21, there is shown a perspective view of an optical module 94 according to a thirteenth preferred embodiment of the present invention. The optical module 94 includes a V-grooved silicon substrate 6, a bare optical fiber 22, and an optical element 52. A V groove 14 is formed on the upper surface of the silicon substrate 6 at one end portion thereof by anisotropic etching of silicon. The bare optical fiber 22 is fitted in the V groove 14 of the substrate 6, and the optical element 52 is mounted on the upper surface of the substrate 6 so as to be substantially aligned with the core of the optical fiber 22. The size of the V groove 14 is set so that the core of the optical fiber 22 fitted in the V groove 14 is optically coupled to the optical element 52. A rectangular groove 96 perpendicular to the V groove 14 is formed by cutting on the upper surface of the substrate 6, so as to eliminate a slant portion formed at one end of the v groove 14 opposed to the optical element 52.

Figure 22A:
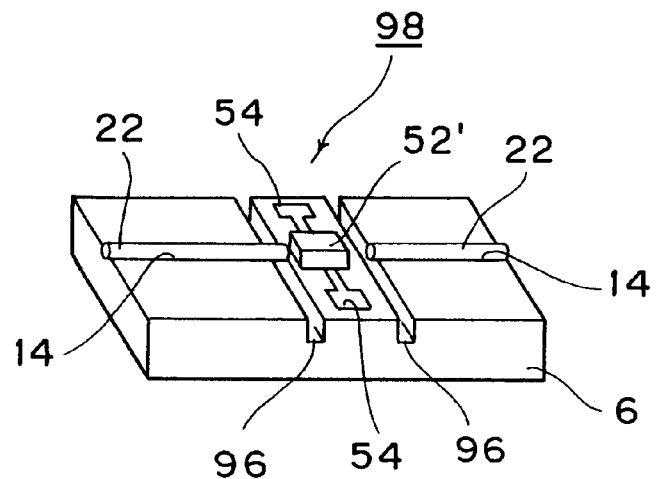
FIG. 22A is a perspective view of a fourteenth preferred embodiment of the present invention.

Referring to FIG. 22A, there is shown a perspective view of an optical module 98 according to a fourteenth preferred embodiment of the present invention. The optical module 98 includes a V-grooved silicon substrate 6, a pair of bare optical fibers 22, and an optical element 52'. A pair of V grooves 14 aligned with each other are formed on the upper surface of the silicon substrate 6 at its opposite end portions. The bare optical fibers 22 are fitted in the V grooves 14 of the substrate 6, and the optical element 52' is mounted on the upper surface of the substrate 6 at its intermediate portion so as to be substantially aligned with the cores of the optical fibers 22. The size of each V groove 14 is set so that the cores of the optical fibers 22 are optically coupled to the optical element 52'. A pair of rectangular grooves 96 for the V grooves 14 are formed on the upper surface of the substrate 6 as similarly to the preferred embodiment shown in FIG. 21. For example, the optical element 52' is an LD amplifier which amplifies an optical signal.

Figure 22B:
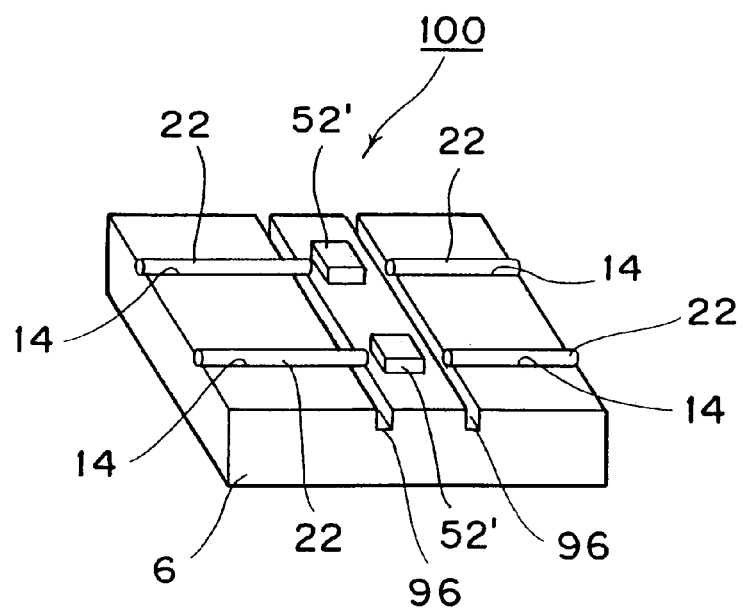
FIG. 22B is a perspective view showing a modification of the fourteenth preferred embodiment.

FIG. 22B shows an optical module 100 as a modification of the preferred embodiment shown in FIG. 22A. The optical module 100 differs from the optical module 98 shown in FIG. 22A in only the point that two pairs of bare optical fibers 22 are fitted in two pairs of V grooves 14, and that a pair of optical elements 52' are mounted on the silicon substrate 6.

Figure 23:
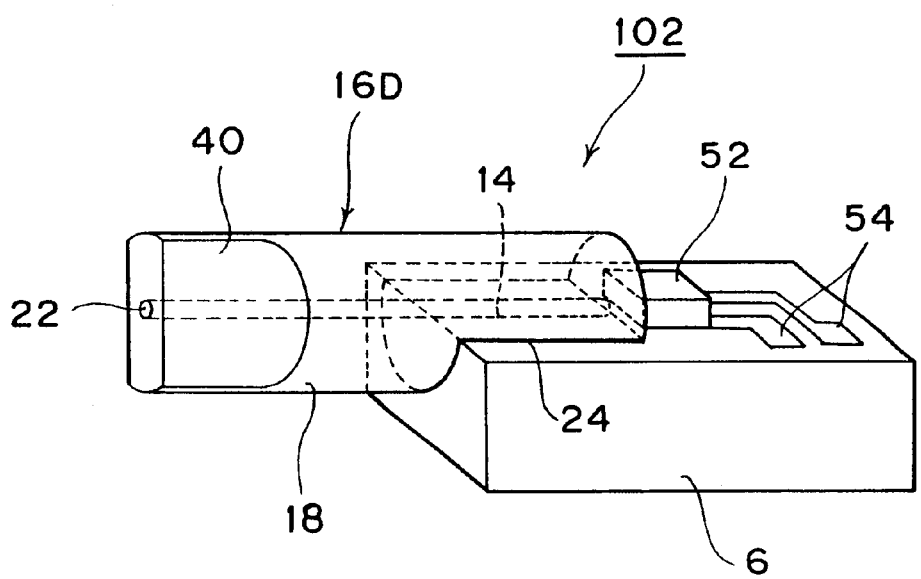
FIG. 23 is a perspective view of a fifteenth preferred embodiment of the present invention.

Referring to FIG. 23, there is shown a perspective view of an optical module 102 according to a fifteenth preferred embodiment of the present invention. The optical module 102 includes a silicon substrate 6 having a V groove 14, a semicut ferrule assembly 16D having a taper 40 similar to that shown in FIG. 8C, and an optical element 52. The semicut ferrule assembly 16D is mounted on the silicon substrate 6 so that the optical fiber 22 of the ferrule assembly 16D is fitted in the V groove 14 of the substrate 6, and the optical element 52 is mounted on the substrate 6 so as to be optically coupled to the core of the optical fiber 22 fitted in the V groove 14.

Figure 24:
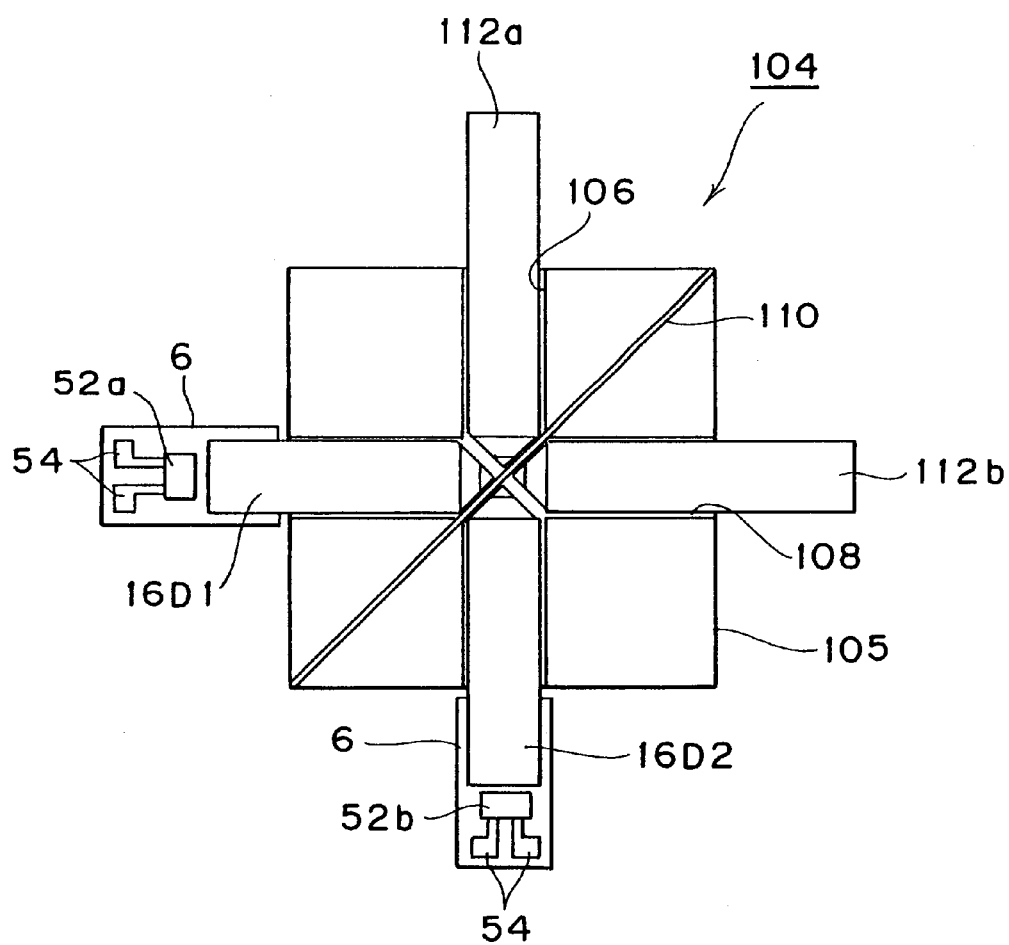
FIG. 24 is a plan view of a sixteenth preferred embodiment of the present invention.

Referring to FIG. 24, there is shown a plan view of an optical module 104 according to a sixteenth preferred embodiment of the present invention. The optical module 104 includes a substrate 105, two cylindrical ferrule assemblies 112a and 112b, two semicut ferrule assemblies 16D1 and 16D2, two optical elements 52a and 52b, and a wavelength filter 110.

Two grooves 106 and 108 orthogonal to each other are formed on the upper surface of the substrate 105. The cylindrical ferrule assemblies 112a and 112b each having a tapered front end are inserted in the grooves 106 and 108, respectively. The semicut ferrule assemblies 16D1 and 16D2 each having a tapered front end are inserted in the grooves 108 and 106, respectively. Thus, the ferrule assemblies 112a and 16D2 are inserted in the groove 106 in such a manner that their respective tapered front ends are opposed to each other, and the ferrule assemblies 112b and 16D1 are inserted in the groove 108 in such a manner that their respective tapered front ends are opposed to each other. Although not shown, optical fibers are inserted and fixed in the through holes of the ferrule assemblies 112a, 112b, 16D1, and 16D2. The wavelength filter 110 is inserted and fixed in a groove formed on the upper surface of the substrate 105 so as to be inclined 45° with respect to the grooves 106 and 108. The optical elements 52a and 52b are mounted on silicon substrates 6 on which the ferrule assemblies 16D1 and 16D2 are mounted.

Incident light from the cylindrical ferrule assembly 112a is transmitted and reflected by the wavelength filter 110, wherein a transmitted component of the light enters the optical element 52b through the ferrule assembly 16D2 and a reflected component of the light enters the optical element 52a through the ferrule assembly 16D1. On the other hand, incident light from the cylindrical ferrule assembly 112b is also transmitted and reflected by the wavelength filter 110, wherein a transmitted component of the light enters the optical element 52a through the ferrule assembly 16D1 and a reflected component of the light enters the optical element 52b through the ferrule assembly 16D2. In the case that the optical element 52a is a light emitting element and the optical element 52b is a photodetecting element, a bidirectional wavelength division multiplexing optical transmission module can be simply fabricated, and the module can be reduced in size.

Figure 25:
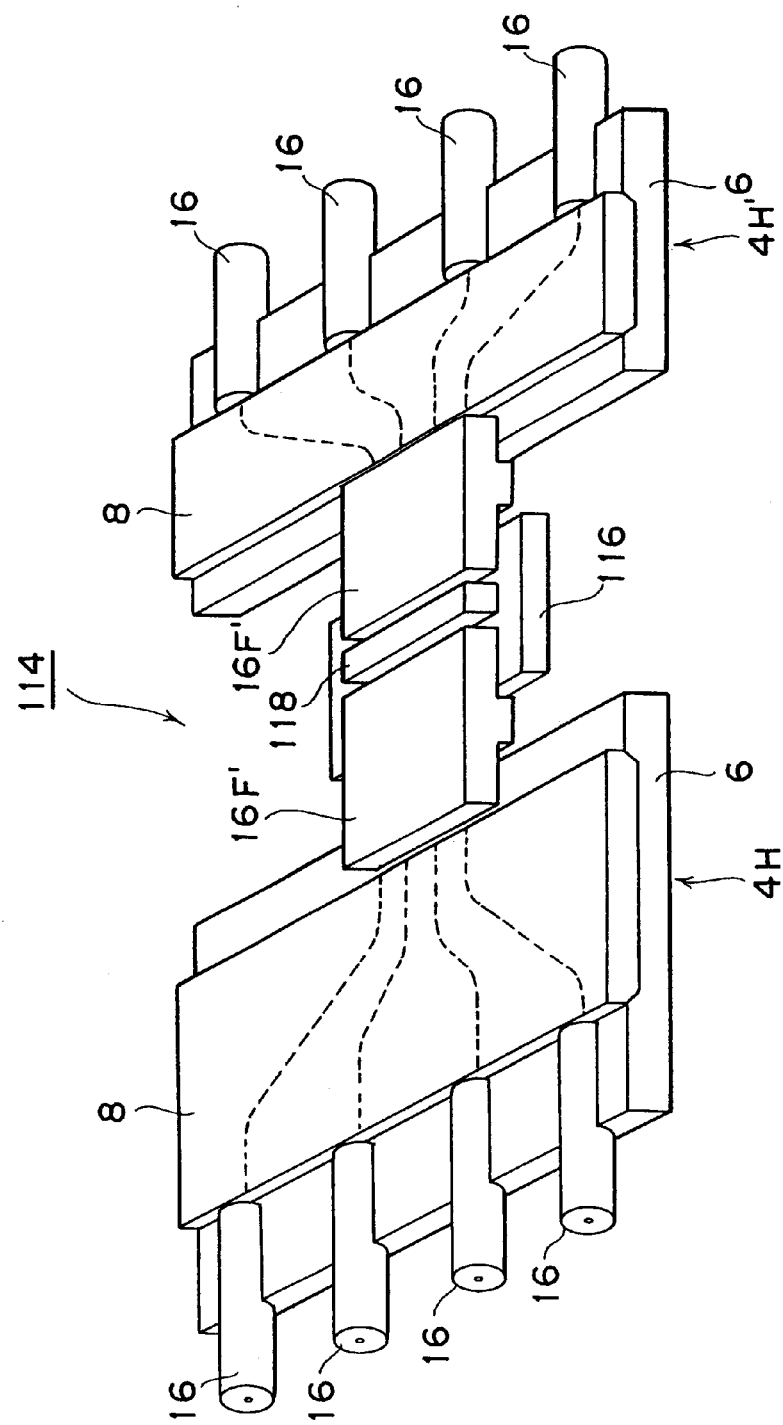
FIG. 25 is a perspective view of a seventeenth preferred embodiment of the present invention.

Referring to FIG. 25, there is shown a perspective view of an optical module 114 according to a seventeenth preferred embodiment of the present invention. The optical module 114 includes a substrate 116, an LD amplifier array 118, a pair of semicut ferrule assemblies 16F', a pair of PLCs 4H and 4H', and a plurality of semicut ferrule assemblies 16. The LD amplifier array 118 is mounted on the substrate 116. The semicut ferrule assemblies 16F' are mounted on the substrate 116 with the LD amplifier array 118 interposed therebetween. Each ferrule assembly 16F' is similar to the ferrule assembly 16F shown in FIG. 9B. The ferrule assemblies 16F' are mounted also on the substrates 6 of the PLCs 4H and 4H'. Thus, the LD amplifier array 118 is optically connected through the ferrule assemblies 16F' to the PLCs 4H and 4H'.

The semicut ferrule assemblies 16 are mounted on the substrate 6 of each of the PLCs 4H and 4H' so as to be optically connected to the optical waveguide layer 8 of each of the PLCs 4H and 4H'. For example, optical signals input through the left ferrule assemblies 16 into the PLC 4H are amplified by the LD amplifier array 118, and amplified optical signals from the LD amplifier array 118 are input into the PLC 4H' and output from the right ferrule assemblies 16.

Figure 26:
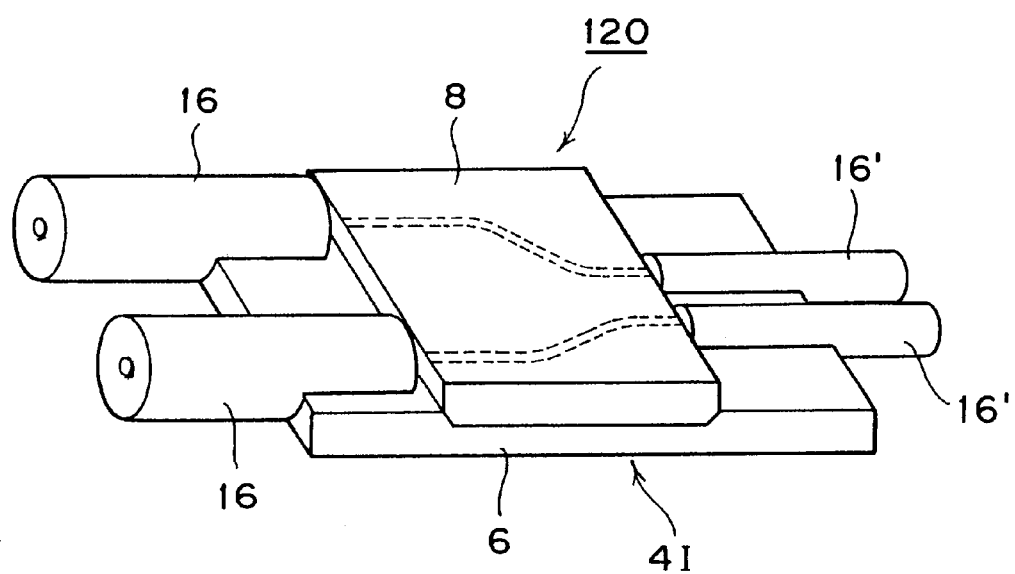
FIG. 26 is a perspective view of an eighteenth preferred embodiment of the present invention.

Referring to FIG. 26, there is shown a perspective view of an optical module 120 according to an eighteenth preferred embodiment of the present invention. The optical module 120 includes a V-grooved PLC 4I, a plurality of semicut ferrule assemblies 16 each having a larger diameter, and a plurality of semicut ferrule assemblies 16' each having a smaller diameter. The ferrule assemblies 16 are mounted on one end portion of the substrate 6 of the PLC 4I, and the ferrule assemblies 16' are mounted on the other end portion of the substrate 6. The ferrule assemblies 16 are arranged with a pitch larger than that of the ferrule assemblies 16'. Thus, the external size and pitch of plural ferrule assemblies can be freely changed.

Figure 27:
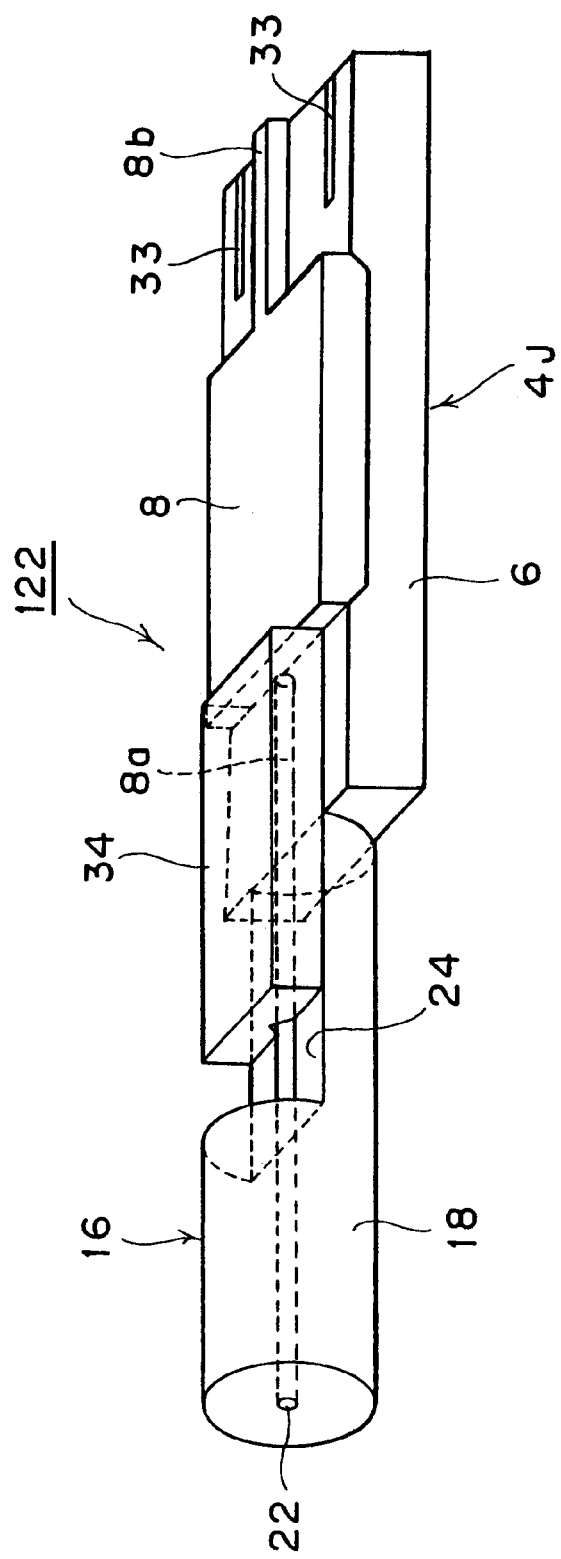
FIG. 27 is a perspective view of a nineteenth preferred embodiment of the present invention.
Figure 28:
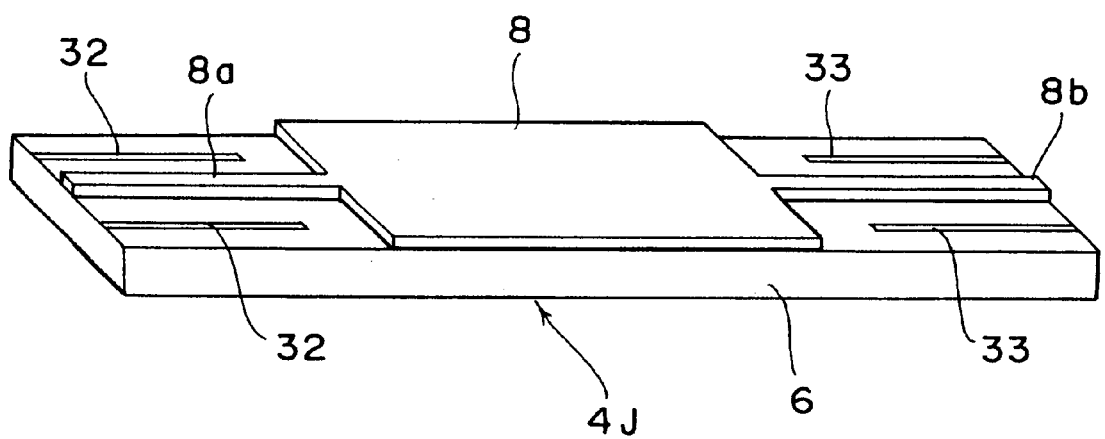
FIG. 28 is a perspective view showing a PLC used in the nineteenth preferred embodiment.
Figure 29A:
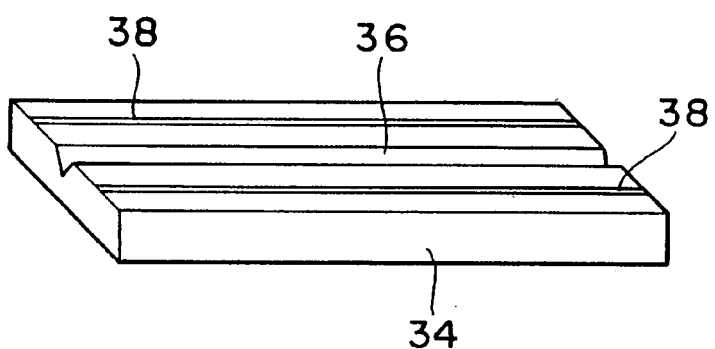
FIG. 29A is a perspective view of a glass plate used in the nineteenth preferred embodiment.

Referring to FIG. 27, there is shown a perspective view of an optical module 122 according to a nineteenth preferred embodiment of the present invention. FIG. 28 shows a PLC 4J used in the nineteenth preferred embodiment, and FIG. 29A is a glass plate 34 used in the nineteenth preferred embodiment. As shown in FIG. 28, the PLC 4J includes a silicon substrate 6 and an optical waveguide layer 8 formed on the silicon substrate 6. The optical waveguide layer 8 has a pair of narrow portions 8a and 8b at the opposite end portions formed by partially cutting the cladding region.

A pair of marker grooves 32 for positioning to the glass plate 34 are formed on the opposite sides of the narrow waveguide portion 8a on the upper surface of the substrate 6, and a pair of marker grooves 33 for positioning to another member (not shown) are formed on the opposite sides of the narrow waveguide portion 8b on the upper surface of the substrate 6. The substrate 6 has no V groove in this preferred embodiment.

As shown in FIG. 29A, the glass plate 34 has a V groove 36 formed by cutting or the like and a pair of marker grooves 38 formed by cutting or the like on the opposite sides of the V groove 36. The PLC 4J and the glass plate 34 are bonded together with a high dimensional accuracy by a passive alignment technique in such a manner that the marker grooves 32 of the PLC 4J are vertically aligned with the marker grooves 38 of the glass plate 34, and that the narrow waveguide portion 8a of the PLC 4J is accommodated in the V groove 36 of the glass plate 34.

Figure 29B:
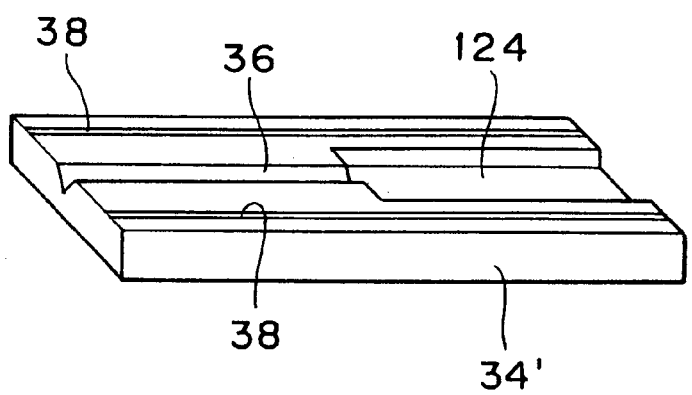
FIG. 29B is a perspective view showing a modification of the glass plate.

The glass plate 34 and the semicut ferrule assembly 16 are bonded together in such a manner that the bare optical fiber 22 of the ferrule assembly 16 is fitted in the V groove 36 of the glass plate 34 to effect positioning by a self alignment technique, and that the flat cut portion 24 of the ferrule assembly 16 is bonded to the glass plate 34. Although the PLC 4J has no V groove, high-precision optical coupling between the bare optical fiber 22 of the ferrule assembly 16 and the optical waveguide core of the PLC 4J can be relatively simply obtained by using the V-grooved glass plate 34. In the case that the width of the narrow waveguide portion 8a is relatively small, the glass plate 34 shown in FIG. 29A is used, whereas in the case that the width of the narrow waveguide portion 8a is relatively large, a glass plate 34' having a wide groove 124 shown in FIG. 29B is used. In the latter case, the narrow waveguide portion 8a is accommodated in the wide groove 124.

Figure 30A:
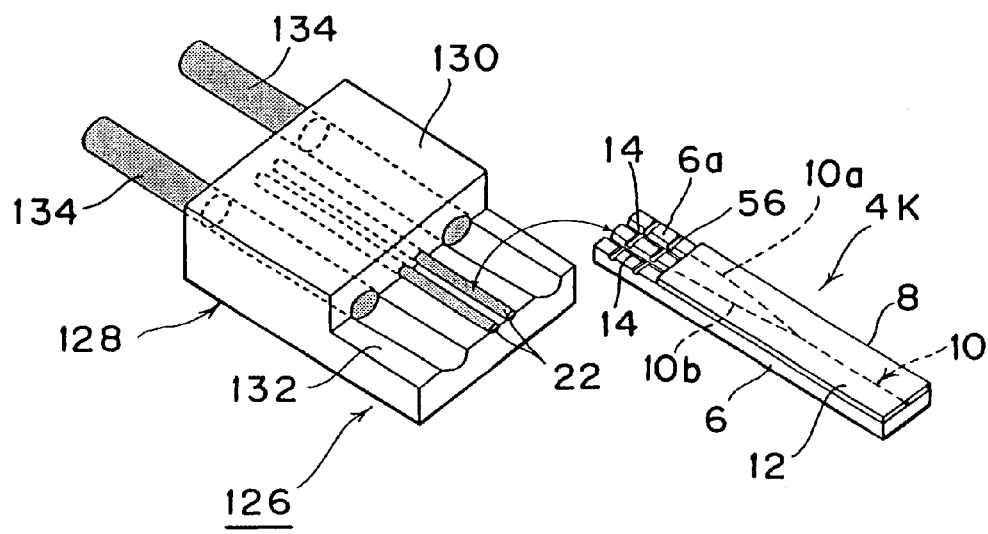
FIG. 30A is an exploded perspective view of a twentieth preferred embodiment of the present invention.
Figure 30B:
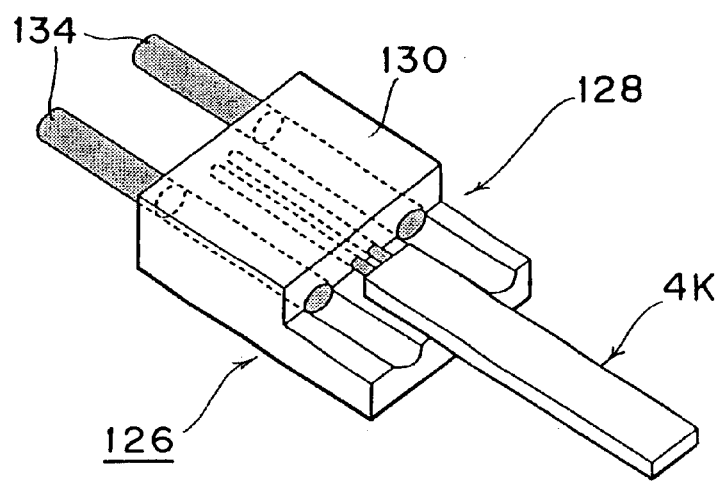
FIG. 30B is a perspective view of the twentieth preferred embodiment in its assembled condition.

Referring to FIG. 30A, there is shown an exploded perspective view of an optical module 126 according to a twentieth preferred embodiment of the present invention. FIG. 30B is a perspective view of the optical module 126 in its assembled condition. The optical module 126 includes a V-grooved PLC 4K and a multifiber semicut connector 128. The PLC 4K includes a silicon substrate 6 and an optical waveguide layer 8 formed on the silicon substrate 6. The optical waveguide layer 8 includes a Y-branched optical waveguide core 10 and an optical waveguide cladding 12 covering the core 10. The Y-branched optical waveguide core 10 consists of a first core portion 10a and a second core portion 10b connected to an intermediate portion of the first core portion 10a. An optical signal propagates in the optical waveguide core 10 having a refractive index higher than that of the optical waveguide cladding 12.

The silicon substrate 6 has an exposed surface 6a formed with two V grooves 14 respectively aligned with the first and second core portions 10a and 10b. The multifiber semicut connector 128 has two bare optical fibers 22 optically coupled to the first and second core portions 10a and 10b. The position and size of the V grooves 14 are set so that when the bare optical fibers 22 are fitted in the V grooves 14, the cores of the optical fibers 22 are substantially aligned with the first and second core portions 10a and 10b of the Y-branched optical waveguide core 10.

The multifiber semicut connector 128 includes a block 130 having two through holes in which the two optical fibers 22 are inserted and fixed. The block 130 has a flat cut portion 132 for semicylindrically exposing the optical fibers 22. The block 130 having the flat cut portion 132 is formed by transfer molding of plastic using a mold. The bare optical fibers 22 are inserted in the through holes of the block 130 and bonded thereto at its portion except the flat cut portion 132. A pair of guide pins 134 are inserted and fixed in other through holes formed in the block 130. The insertion and fixing of the guide pins 134 may be carried out after connecting the PLC 4K to the multifiber semicut connector 128.

The PLC 4K is bonded at the exposed surface 6a to the flat cut portion 132 of the multifiber semicut connector 128 so that the optical fibers 22 of the connector 128 are fitted in the V grooves 14 of the PLC 4K. Accordingly, the cores of the optical fibers 22 are substantially aligned with the first and second core portions 10a and 10b of the Y-branched optical waveguide core 10, thereby realizing low-loss optical coupling. The exposed surface 6a of the silicon substrate 6 of the PLC 4K to which the flat cut portion 132 of the connector 128 is bonded is further formed with a plurality of grooves 56 for receiving an adhesive.

The optical module 126 according to this preferred embodiment can solve the problems in the conventional receptacle structure, and has the following advantages.

(1) It is not necessary to form deep V grooves for mounting the guide pins 134 on the PLC substrate 6, so that the PLC substrate 6 can be reduced in thickness and width to thereby reduce material cost.

(2) It is not necessary to provide a pressure plate for fixing the bare optical fibers 22 to the block 130, so that the number of parts and assembly cost can be minimized.

(3) Dimensional errors of each V groove 14 and each bare optical fiber 22 are small, so that a misalignment between each of the first and second core portions 10a and 10b and the core of the corresponding bare optical fiber 22 can be reduced, thereby minimizing an optical coupling loss.

Figure 31:
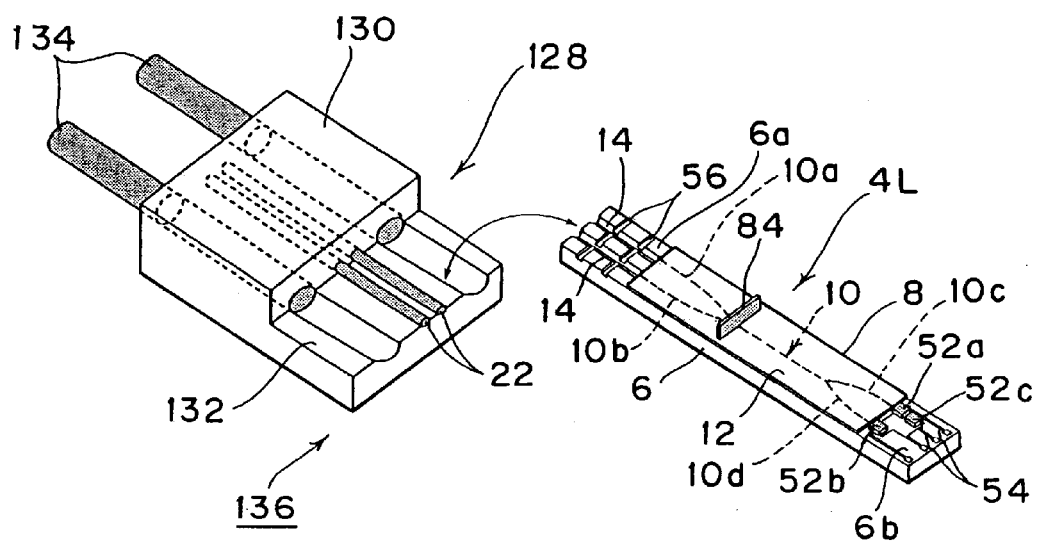
FIG. 31 is an exploded perspective view of a twenty-first preferred embodiment of the present invention.

Referring to FIG. 31, there is shown an exploded perspective view of an optical module 136 according to a twenty-first preferred embodiment of the present invention. The optical module 136 differs from the optical module 126 shown in FIG. 30A in only the structure of a PLC 4L. The PLC 4L includes a V-grooved silicon substrate 6 having exposed surfaces 6a and 6b at the opposite end portions, and an optical waveguide layer 8 formed on an intermediate portion of the silicon substrate 6. Two V grooves 14 are formed on the exposed surface 6a of the substrate 6, and three optical elements 52a, 52b, and 52c are mounted on the exposed surface 6b of the substrate 6. The optical waveguide layer 8 includes a Y-branched optical waveguide core 10 and an optical waveguide cladding 12 covering the core 10. The optical waveguide core 10 includes first and second core portions 10a and 10b respectively aligned with the two V grooves 14, and third and fourth core portions 10c and 10d respectively aligned with the optical elements 52a and 52b. For example, the optical element 52a is a laser diode, the optical element 52b is a photodiode for detection of an optical signal, and the optical element 52c is a photodiode for monitoring of light. Reference numerals 54 are electrodes for the optical elements 52a, 52b, and 52c.

Figure 32:
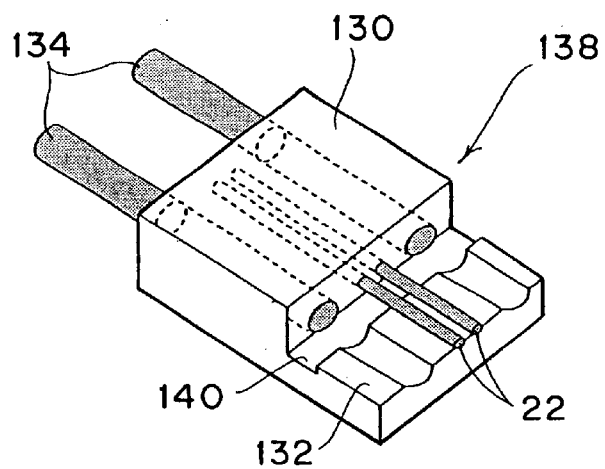
FIG. 32 is a perspective view showing another preferred embodiment of a multfiber semicut connector.

Referring to FIG. 32, there is shown a perspective view of a multifiber semicut connector 138 according to another preferred embodiment. The multifiber semicut connector 138 differs from the connector 128 shown in FIG. 30A in only the point that a groove 140 is additionally formed. The groove 140 is formed on the flat cut portion 132 near the boundary between the exposed part of the optical fibers 22 and the unexposed part of the optical fibers 22 so as to extend in a direction perpendicular to the optical fibers 22. The groove 140 has a width of 0.1 to 1 mm, for example, and is slightly lowered from the horizontal upper surface of the flat cut portion 132. In fixing the optical fibers 22 inserted in the through holes of the block 130 by means of an adhesive, the groove 140 functions to receive the adhesive leaked from the through holes, thereby preventing the adhesive from sticking to the horizontal surface of the flat cut portion 132 where the exposed part of the optical fibers 22 is placed.

Figure 33:
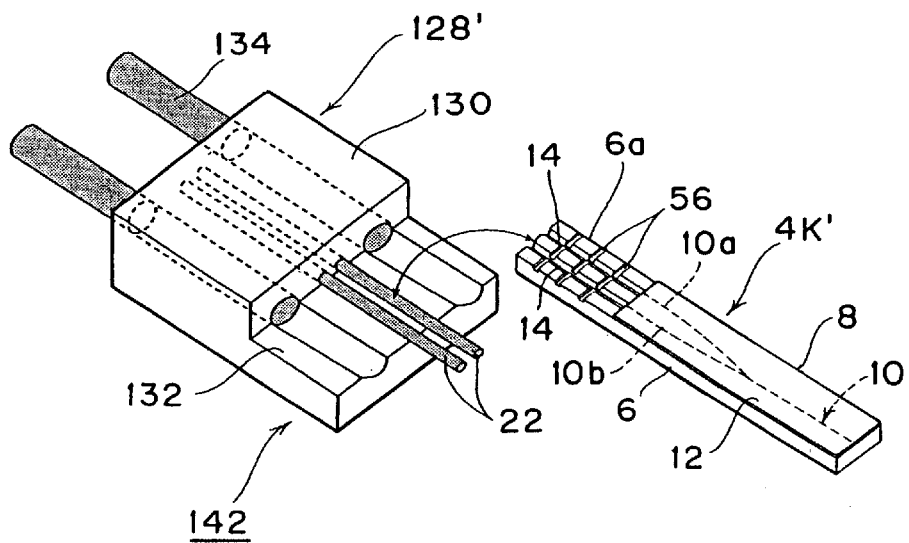
FIG. 33 is an exploded perspective view of a twenty-second preferred embodiment of the present invention.

Referring to FIG. 33, there is shown an exploded perspective view of an optical module 142 according to a twenty-second preferred embodiment of the present invention. The optical module 142 includes a multifiber semicut connector 128' and a PLC 4K'. The multifiber semicut connector 128' is similar to the connector 128 shown in FIG. 30A except that the bare optical fibers 22 of the connector 128' project from the block 130 by about 0.1 to 2 mm. The PLC 4K' is similar to the PLC 4K shown in FIG. 30A except that the exposed surface 6a of the PLC 4K' is longer than that of the PLC 4K. By projecting the optical fibers 22 from the block 130, a space between the front ends of the optical fibers 22 and the first and second core portions 10a and 10b of the optical waveguide core 10 or optical elements (not shown) can be easily controlled.

Figure 34:
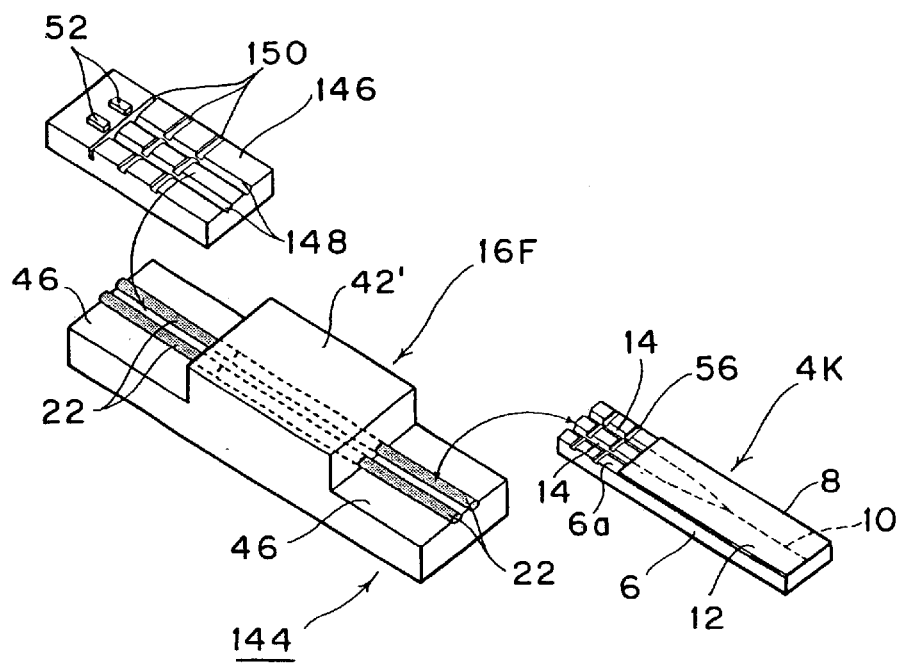
FIG. 34 is an exploded perspective view of a twenty-third preferred embodiment of the present invention.

Referring to FIG. 34, there is shown an exploded perspective view of an optical module 144 according to a twenty-third preferred embodiment of the present invention. The optical module 144 includes a semicut ferrule assembly 16F similar to that shown in FIG. 9B, a PLC 4K similar to that shown in FIG. 30A, a substrate 146 having two V grooves 148, and two optical elements 52 mounted on the substrate 146. The two optical elements 52 are aligned with the two V grooves 148, respectively. A plurality of grooves 150 for receiving an adhesive are also formed on the substrate 146. The grooves 150 extend over the width of the substrate 146 in perpendicular relationship to the V grooves 148.

The PLC 4K is bonded to the flat cut portion 46 formed at one end portion of the ferrule assembly 16F so that an exposed part of the optical fibers 22 of the ferrule assembly 16F is fitted in the V grooves 14 of the PLC 4K. On the other hand, the substrate 146 is bonded to the other flat cut portion 46 of the ferrule assembly 16F so that the other exposed part of the optical fibers 22 of the ferrule assembly 16F is fitted in the V grooves 148 of the substrate 146. According to this preferred embodiment, the optical elements 52 mounted on the substrate 146 are optically coupled through the ferrule assembly 16F to the PLC 4K.

Figure 35A:
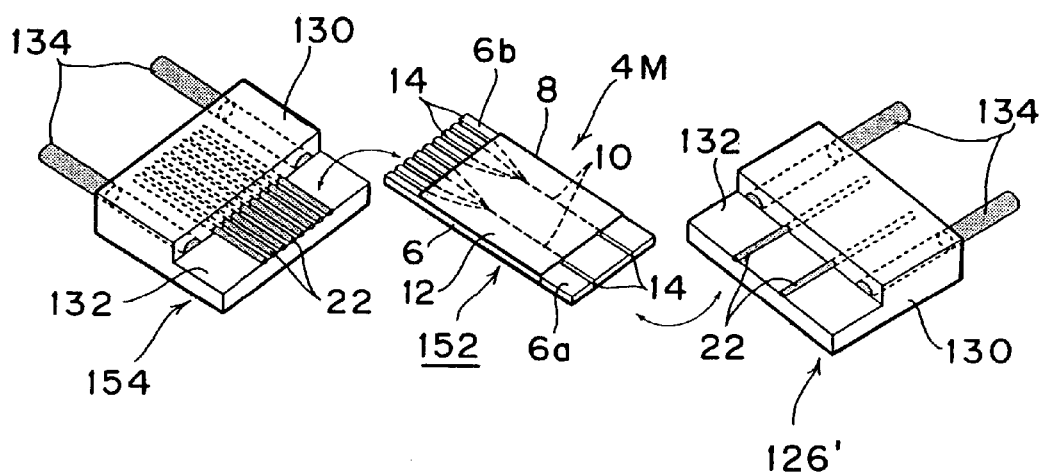
FIG. 35A is an exploded perspective view of a twenty-fourth preferred embodiment of the present invention.
Figure 35B:
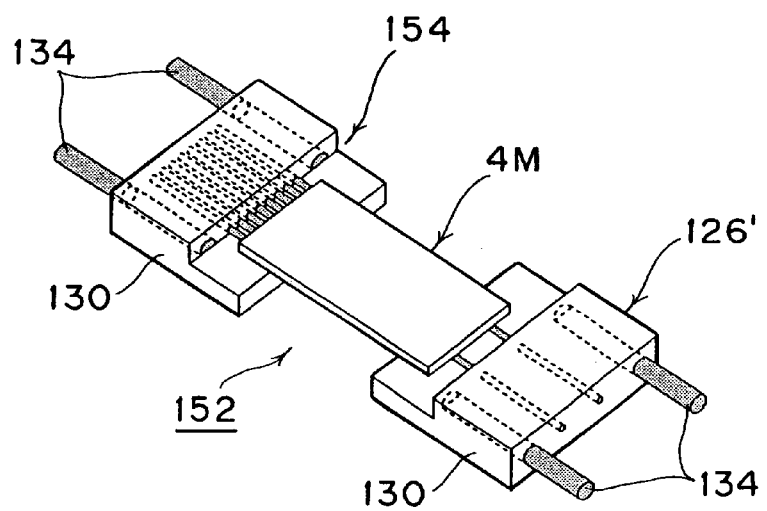
FIG. 35B is a perspective view of the twenty-fourth preferred embodiment in its assembled condition.

Referring to FIG. 35A, there is shown an exploded perspective view of an optical module 152 according to a twenty-fourth preferred embodiment of the present invention. FIG. 35B is a perspective view of the optical module 152 in its assembled condition. The optical module 152 includes a V-grooved PLC 4M and two multifiber semicut connectors 126' and 154 optically coupled to each other through the PLC 4M.

The PLC 4M includes a silicon substrate 6 and an optical waveguide layer 8 formed on an intermediate portion of the substrate 6. The substrate 6 has an exposed surface 6a at one end portion and another exposed surface 6b at the other end portion. The exposed surface 6a is formed with two V grooves 14, and the exposed surface 6b is formed with at least four V grooves 14. The optical waveguide layer 8 includes two Y-branch type (1×N branch type where N is an integer greater than 1) optical waveguide cores 10 and an optical waveguide cladding 12 covering the cores 10. Each optical waveguide core 10 has one end aligned to one of the V grooves 14 formed on the exposed surface 6a and has N ends aligned to N of the V grooves 14 formed on the exposed surface 6b. The flat cut portion 132 of the connector 126' is bonded to the exposed surface 6a of the PLC 4M so that the optical fibers 22 of the connector 126' are fitted in the V grooves 14 formed on the exposed surface 6a. On the other hand, the flat cut portion 132 of the connector 154 is bonded to the exposed surface 6b of the PLC 4M so that the optical fibers 22 of the connector 154 are fitted in the V grooves 14 formed on the exposed surface 6b. Accordingly, an optical signal input from the connector 126' can be branched into a plurality of optical signals in the PLC 4M, and the resultant optical signals can be output from the connector 154. Conversely, a plurality of optical signals input from the connector 154 can be combined to an optical signal in the PLC 4M, and the resultant optical signal can be output from the connector 126'.

Figure 36A:
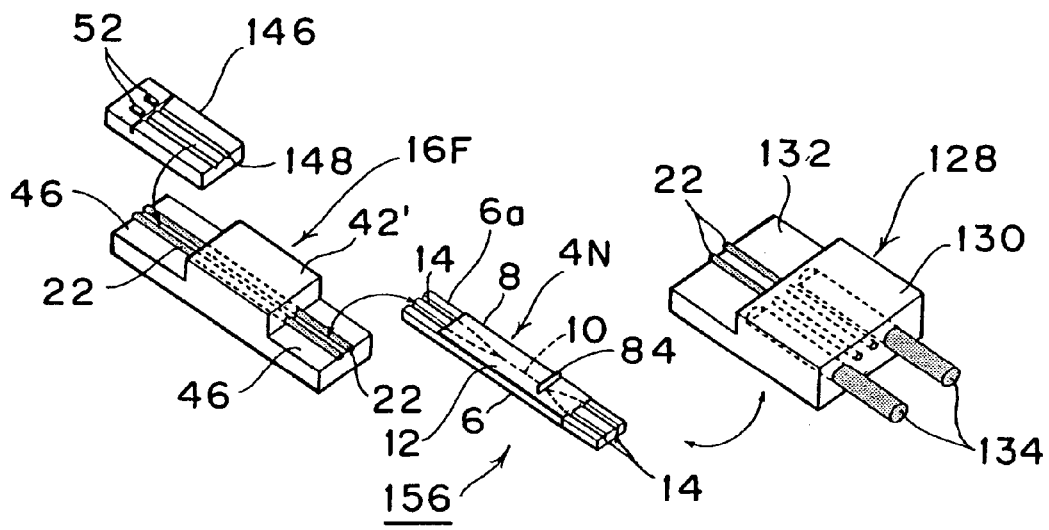
FIG. 36A is an exploded perspective view of a twenty-fifth preferred embodiment of the present invention.
Figure 36B:
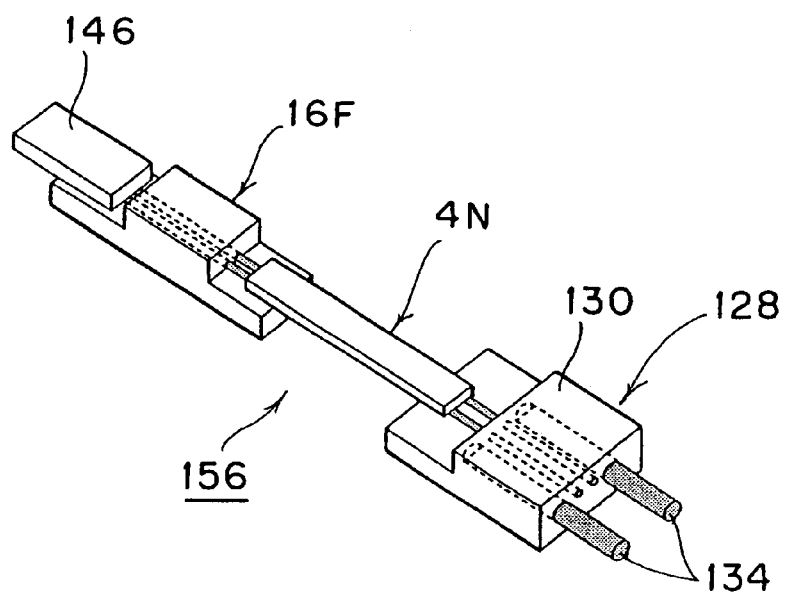
FIG. 36B is a perspective view of the twenty-fifth preferred embodiment in its assembled condition.

Referring to FIG. 36A, there is shown an exploded perspective view of an optical module 156 according to a twenty-fifth preferred embodiment of the present invention. FIG. 36B is a perspective view of the optical module 156 in its assembled condition. The optical module 156 is similar to the optical module 144 shown in FIG. 34 with the exception that a multifiber semicut connector 128 is added. That is, the optical module 156 includes a PLC 4N, a semicut ferrule assembly 16F, a substrate 146, and the multifiber semicut connector 128. The PLC 4N includes a V-grooved silicon substrate 6 and an optical waveguide layer 8 formed on an intermediate portion of the silicon substrate 6. The silicon substrate 6 has exposed surfaces 6a and 6b at the opposite end portions. Each of the exposed surfaces 6a and 6b is formed with two V grooves 14. The optical waveguide layer 8 includes a Y-branch type optical waveguide core 10 and an optical waveguide cladding 12 covering the core 10 as similar to the structure of the PLC 4L shown in FIG. 31. A wavelength filter 84 is mounted on the optical waveguide layer 8.

The PLC 4N is bonded at the exposed surface 6a to the flat cut portion 46 of the ferrule assembly 16F at its one end portion so that the optical fibers 22 exposed to this portion of the ferrule assembly 16F are fitted in the V grooves 14 formed on the exposed surface 6a of the PLC 4N. The substrate 146 is bonded to the flat cut portion 46 of the ferrule assembly 16F at its other end portion so that the optical fibers 22 exposed to this portion of the ferrule assembly 16F are fitted in the V grooves 148 of the substrate 146. The multifiber semicut connector 128 is similar to that shown in FIG. 31. The connector 128 is bonded at the flat cut portion 132 to the exposed surface 6b of the PLC 4N so that the optical fibers 22 exposed to the flat cut portion 132 are fitted in the V grooves 14 formed on the exposed surface 6b. According to this preferred embodiment, the optical elements 52 mounted on the substrate 146 can be optically coupled through the ferrule assembly 16F and the PLC 4N to the connector 128.

Figure 37A:
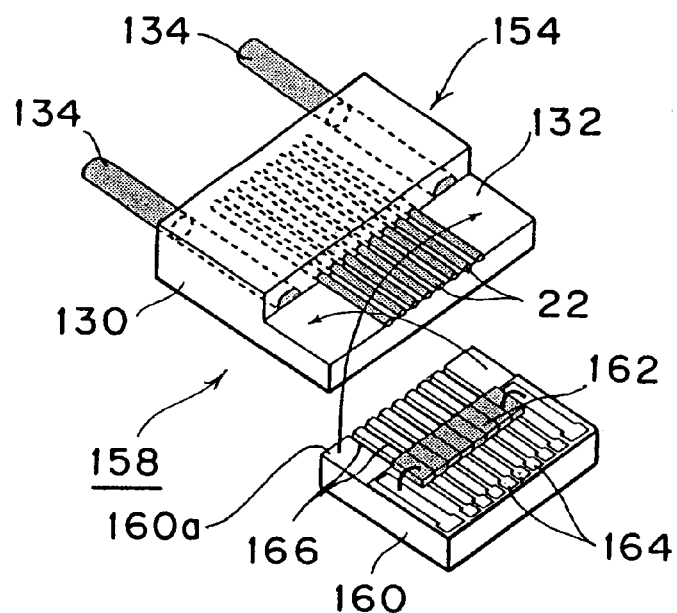
FIG. 37A is an exploded perspective view of a twenty-sixth preferred embodiment of the present invention.
Figure 37B:
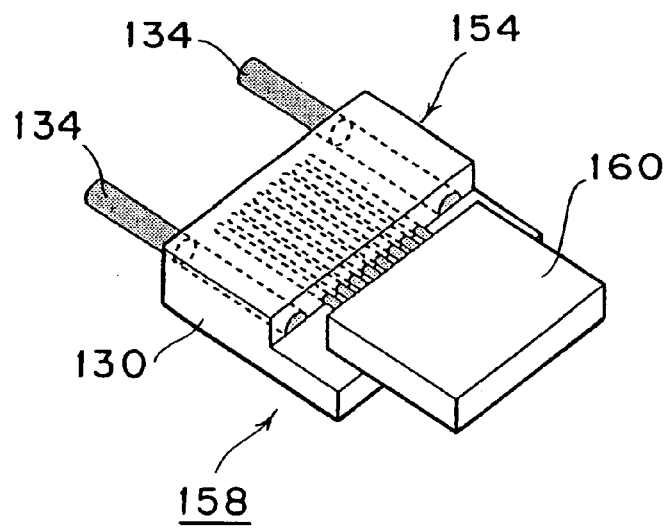
FIG. 37B is a perspective view of the twenty-sixth preferred embodiment in its assembled condition.

Referring to FIG. 37A, there is shown an exploded perspective view of an optical module 158 according to a twenty-sixth preferred embodiment of the present invention. FIG. 37B is a perspective view of the optical module 158 in its assembled condition. The optical module 158 includes a V-grooved substrate 160, an optical element array 162 mounted on the substrate 160, and a multifiber semicut connector 154 similar to that shown in FIG. 35A. The optical element array 162 is an LD array or a PD array, for example. A plurality of electrodes 164 for the optical element array 162 are formed on the substrate 160. The substrate 160 has a mount surface 160a formed with a plurality of V grooves 166 respectively corresponding to a plurality of individual optical elements constituting the optical element array 162. The substrate 160 is bonded at the mount surface 160a to the flat cut portion 132 of the connector 154 so that the optical fibers 22 of the connector 154 are fitted in the V grooves 166 of the substrate 160. With this configuration, the individual optical elements of the optical element array 162 are optically coupled to the optical fibers 22, respectively.

Figure 38:
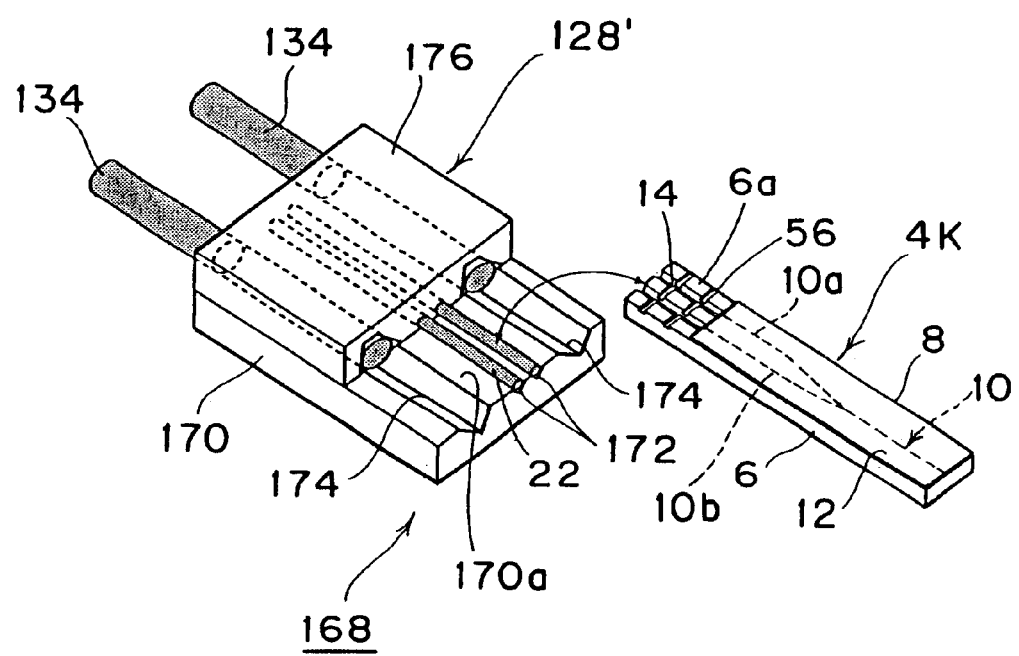
FIG. 38 is an exploded perspective view of a twenty-seventh preferred embodiment of the present invention.

Referring to FIG. 38, there is shown an exploded perspective view of an optical module 168 according to a twenty-seventh preferred embodiment of the present invention. The optical module 168 is similar to the optical module 126 shown in FIG. 30A except that a multifiber semicut connector 128' is used in place of the connector 128. The multifiber semicut connector 128' includes a silicon substrate 170 having two V grooves 172 and two V grooves 174, two optical fibers 22 fitted in the two V grooves 172, two guide pins 134 fitted in the two V grooves 174, and a cover 176 fixed to the silicon substrate 170 for partially covering the optical fibers 22 and the guide pins 134. The silicon substrate 170 has an exposed surface 170a for semicylindrically exposing the optical fibers 22. The cover 176 also has two V grooves respectively opposed to the two V grooves 172 for the optical fibers 22 and two V grooves respectively opposed to the two V grooves 174 for the guide pins 134. The PLC 4K is bonded at the exposed surface 6a to the exposed surface 170a of the substrate 170 so that the optical fibers 22 are fitted in the V grooves 14 of the PLC 4K.

Figure 39A:
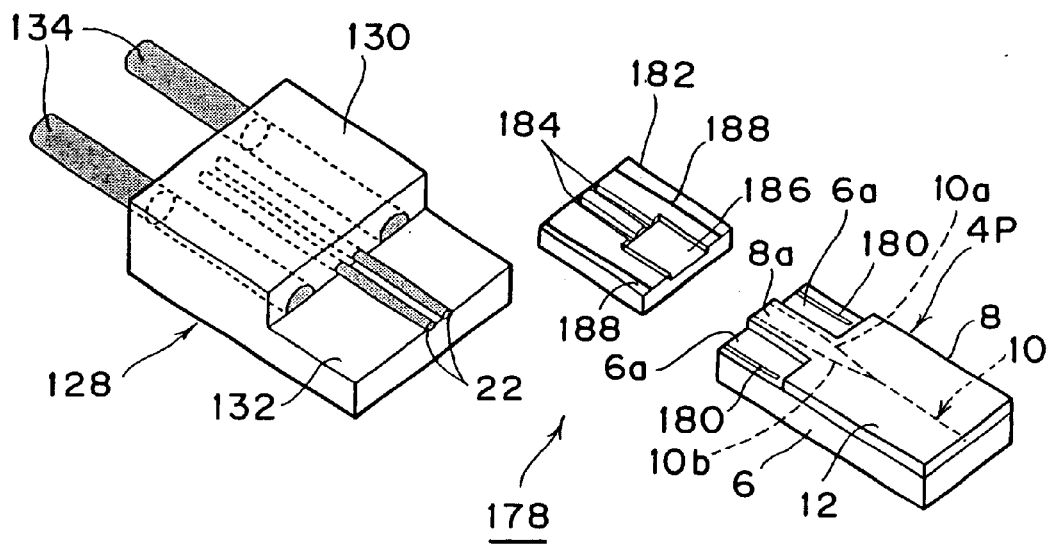
FIG. 39A is an exploded perspective view of a twenty-eighth preferred embodiment of the present invention.
Figure 39B:
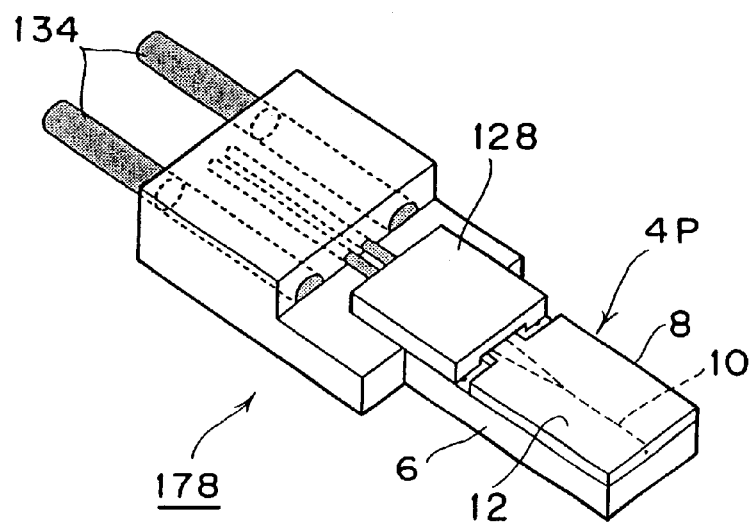
FIG. 39B is a perspective view of the twenty-eighth preferred embodiment in its assembled condition.

Referring to FIG. 39A, there is shown an exploded perspective view of an optical module 178 according to a twenty-eighth preferred embodiment of the present invention. FIG. 39B is a perspective view of the optical module 178 in its assembled condition. The optical module 178 includes a PLC 4P, a multifiber semicut connector 128 similar to that shown in FIG. 30A, and a V-grooved glass plate 182. The PLC 4P includes a silicon substrate 6 and an optical waveguide layer 8 formed on the silicon substrate 6. The optical waveguide layer 8 includes a Y-branched optical waveguide core 10 and an optical waveguide cladding 12 covering the core 10. The Y-branched optical waveguide core 10 consists of a first core portion 10a and a second core portion 10b connected to an intermediate portion of the first core portion 10a. The cladding 12 is partially removed at one end portion of the layer 8 to form a narrow waveguide portion 8a. The narrow waveguide portion 8a includes the first and second core portions 10a and 10b. Accordingly, the silicon substrate 6 has two exposed surfaces 6a on the opposite sides of the narrow waveguide portion 8a. A pair of marker grooves 180 are formed on the exposed surfaces 6a of the substrate 6.

The glass plate 182 is formed with two V grooves 184 for receiving the optical fibers 22 of the connector 128, a relatively wide groove 186 for receiving the narrow waveguide portion 8a of the optical waveguide layer 8 of the PLC 4P, and a pair of marker grooves 188 to be vertically aligned with the pair of marker grooves 180 of the PLC 4P. The PLC 4P is bonded at the exposed surfaces 6a to the glass plate 182 so that the narrow waveguide portion 8a of the PLC 4P is accommodated in the groove 186 of the glass plate 182 and that the marker grooves 180 of the PLC 4P are vertically aligned with the marker grooves 188 of the glass plate 182, thereby positioning and fixing the PLC 4P and the glass plate 182 with a high dimensional accuracy by a passive alignment technique.

The glass plate 182 is bonded to the flat cut portion 132 of the connector 128 so that the optical fibers 22 of the connector 128 are fitted in the V grooves 184 of the glass plate 182 to thereby position the glass plate 182 to the connector 128. Although the PLC 4P has no V grooves, high-precision optical coupling between the bare optical fibers 22 of the connector 128 and the first and second core portions 10*a* and 10*b* of the optical waveguide core 10 of the PLC 4P can be realized relatively simply by using the V-grooved glass plate 182.

According to the present invention, it is possible to provide a receptacle type optical module suitable for cost reduction and size reduction by using a semicut ferrule assembly at an interface to an optical fiber.

What is claimed is:

1. A ferrule assembly comprising:

a ferrule having a through hole, a cylindrical portion, a flat cut portion exposing the through hole, a first end and a second end; and an optical fiber inserted in said through hole and fixed therein at said cylindrical portion, said optical fiber having a first end flush with the first end of said ferrule and a second end flush with the second end of said ferrule;

wherein said ferrule is semicylindrically exposed at said flat cut portion.

2. An apparatus comprising:

a ferrule having a through hole in which an optical fiber is inserted and fixed at a first and second end of the ferrule; and a flat cut portion located near the first end of the ferrule, said flat cut portion semicylindrically exposing a portion of the optical fiber which is flush with the first end of the ferrule.

3. An apparatus comprising:

a ferrule having a through hole in which an optical fiber is inserted and fixed at a first and second end of the ferrule; and means for providing a flat cut portion located near the first end of the ferrule, said flat cut portion semicylindrically exposing a portion of the optical fiber which is flush with the first end of the ferrule.

4. An apparatus comprising:

a ferrule having a first and second end with a through hole therein;

an optical fiber inserted into said through hole and fixed therein, wherein the optical fiber is flush with the first and second end of the ferrule; and a flat cut portion located near the first end of the ferrule and semicylindrically exposing a portion of the optical fiber which is flush with the first end of the ferrule.

* * * * *

UNITED STATES PATENT AND TRADEMARK OFFICE
CERTIFICATE OF CORRECTION

PATENT NO. : 6,241,399 B1
DATED : June 5, 2001
INVENTOR(S) : Hiroyuki Nobuhara et al.

It is certified that error appears in the above-identified patent and that said Letters Patent is hereby corrected as shown below:

<u>Title page,</u>
Item [56], References Cited, please add the following references which were omitted:
-- 5,764,836    6/1998       Roff           385/88 --
-- 5,071,215    12/1991      Hockaday       385/88 --

Signed and Sealed this

Nineteenth Day of February, 2002

Attest:

*Attesting Officer*

JAMES E. ROGAN
*Director of the United States Patent and Trademark Office*